US011867920B2

(12) United States Patent
Liang et al.

(10) Patent No.: US 11,867,920 B2
(45) Date of Patent: Jan. 9, 2024

(54) BEAM SPLITTING AND COMBINING DEVICE AND ELECTRONIC DEVICE

(71) Applicants: Sintai Optical (Shenzhen) Co., Ltd., ShenZhen (CN); Asia Optical Co., Inc., Taichung (TW)

(72) Inventors: Ting-Wei Liang, Taichung (TW); Po-Yuan Huang, Taichung (TW); Chih-Peng Wang, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 0 days.

(21) Appl. No.: 17/558,918

(22) Filed: Dec. 22, 2021

(65) Prior Publication Data
US 2022/0221729 A1  Jul. 14, 2022

(30) Foreign Application Priority Data

Jan. 8, 2021 (CN) .......................... 202110021657.6
Feb. 5, 2021 (CN) .......................... 202110162543.3

(51) Int. Cl.
| | |
|---|---|
| G02B 27/10 | (2006.01) |
| G03B 21/20 | (2006.01) |
| G02B 27/14 | (2006.01) |
| G02B 5/04 | (2006.01) |
| H04N 23/16 | (2023.01) |

(52) U.S. Cl.
CPC ........... *G02B 27/1013* (2013.01); *G02B 5/04* (2013.01); *G02B 27/14* (2013.01); *H04N 23/16* (2023.01)

(58) Field of Classification Search
CPC ........... G02B 27/1006; G02B 27/1013; G02B 27/102; G02B 27/1026; G02B 27/1046; G03B 21/2066; G03B 21/208; H04N 9/3164
See application file for complete search history.

(56) References Cited

U.S. PATENT DOCUMENTS

| | | | |
|---|---|---|---|
| 7,568,805 B2 | 8/2009 | Lee et al. | |
| 9,122,043 B2 | 9/2015 | Kawana | |
| 10,133,034 B2 | 11/2018 | Sun | |

(Continued)

FOREIGN PATENT DOCUMENTS

| | | |
|---|---|---|
| CN | 1734313 A | 2/2006 |
| CN | 101126823 A | 2/2008 |

(Continued)

*Primary Examiner* — Ryan D Howard
(74) *Attorney, Agent, or Firm* — McClure, Qualey & Rodack, LLP

(57) ABSTRACT

A beam splitting and combining device includes a first prism, a second prism and a first optical film. The first prism includes a first surface, a second surface and a third surface. The second prism includes a fourth surface, a fifth surface and a sixth surface. The fifth surface and the second surface are attached to each other. The first optical film is formed between the second surface and the fifth surface by coating. A beam in a first range of wavelengths is configured to pass through the first surface, the second surface, the first optical film, the fifth surface and the sixth surface in order or in reverse order, or is configured to pass through the first surface and the third surface in order or in reverse order.

15 Claims, 13 Drawing Sheets

(56) References Cited

U.S. PATENT DOCUMENTS

| | | | |
|---|---|---|---|
| 2003/0011752 A1* | 1/2003 | Ikeda | G02B 27/1026 353/31 |
| 2009/0168041 A1* | 7/2009 | Sawai | G02B 27/0994 355/71 |
| 2019/0271832 A1 | 9/2019 | Kuo | |
| 2020/0124827 A1 | 4/2020 | Tseng et al. | |

FOREIGN PATENT DOCUMENTS

| | | |
|---|---|---|
| CN | 101770066 A | 7/2010 |
| CN | 101995647 A | 3/2011 |
| CN | 103293641 A | 9/2013 |
| CN | 107436474 A | 12/2017 |
| CN | 212112011 U | 12/2020 |
| IN | 103293641 A | 9/2013 |
| JP | 2001264637 A | 9/2001 |
| JP | 2005148615 A | 6/2005 |
| JP | 2008292672 A | 12/2008 |
| JP | 2019028294 A | 2/2019 |
| TW | 200949288 A | 12/2009 |
| TW | 201939088 A | 10/2019 |
| WO | 2013108622 A1 | 7/2013 |

\* cited by examiner

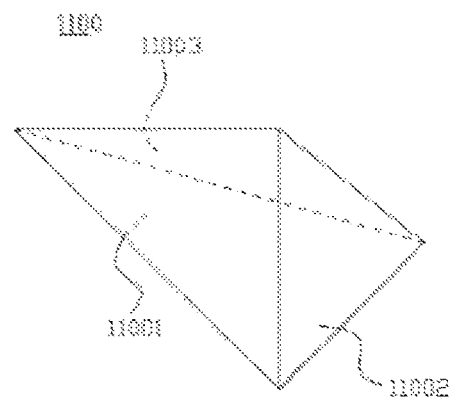
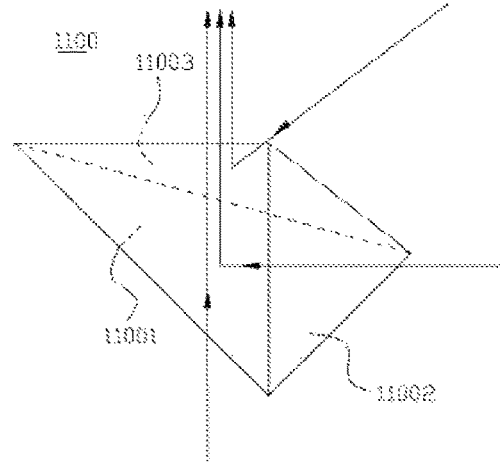
Fig. 14A
Fig. 14B
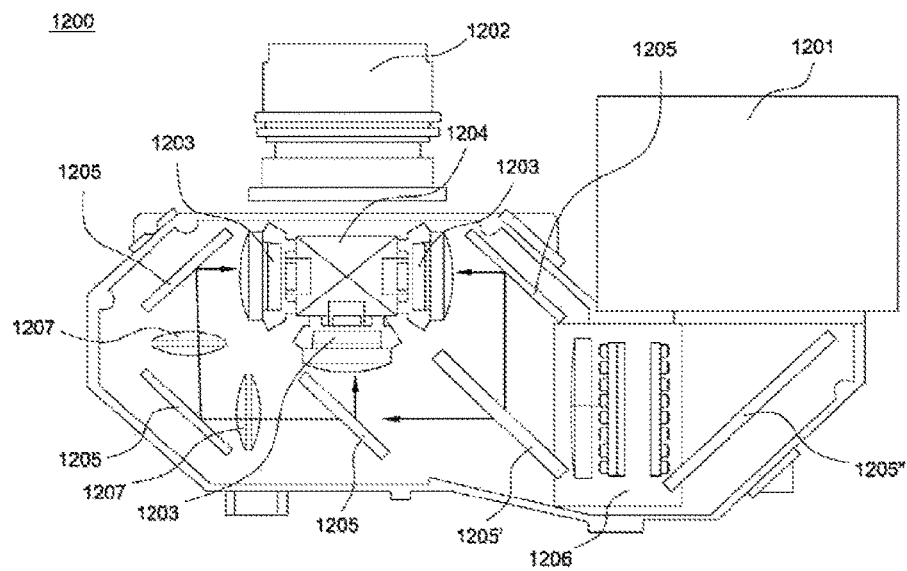
Fig. 15

BEAM SPLITTING AND COMBINING DEVICE AND ELECTRONIC DEVICE

BACKGROUND OF THE INVENTION

Field of the Invention

The invention relates to an optical field, and more particularly to a beam splitting and combining device and an electronic device.

Description of the Related Art

FIG. 1 is a schematic diagram of a conventional liquid crystal on silicon (LCOS) projector 1. In operation, light emitted from a light source 11 of the projector 1 and passing through two color lenses 12 and 13 is split into red light, green light and blue light. The red light, green light and blue light respectively pass through the corresponding polarized beam splitters 14, 15 and 16 and are reflected to the corresponding LCOS panels 17, 18 and 19, by which the polarizations of the red light, green light and blue light are changed. Then, the red light, green light and blue light are reflected back to the corresponding polarized beam splitters 14, 15 and 16, are combined by a beam-combining prism 10, and are projected from a projection lens of the projector 1.

FIG. 2 is a schematic diagram of the beam-combining prism 10 of FIG. 1. As shown in FIG. 2, the beam-combining prism 10 is formed by connecting four prisms 10a, 10b, 10c and 10d. The four prisms 10a, 10b, 10c and 10d have a gap A therebetween. When combined by the beam-combining prism 10, the red light, green light and blue light propagating therein may reaches the gap A. That causes imaging error and affects the image quality.

FIG. 3 is a schematic diagram of a known digital light processing (DLP) projector 20. In operation, light emitted from a light source 21 of the projector 20 and passing through a total reflection prism 22 is split into red light, green light and blue light by a beam splitting and combining prism 23. The red light, green light and blue light respectively pass through the corresponding digital micromirror devices (DMDs), are reflected back to the beam splitting and combining prism, are combined, and are projected from a projection lens 24 of the projector 20.

The beam splitting and combining prism 23 is formed by connecting three prisms which are placed in a staggered arrangement. Therefore, the incident light does not propagate through the gap formed between the three prisms. However, the beam splitting and combining prism 23 is large and heavy and miniaturization of the beam splitting and combining prism 23 is difficult. Also, a projector provided with such a beam splitting and combining prism is too large in volume.

BRIEF SUMMARY OF THE INVENTION

As described, a known beam splitting and combining device has gaps between prisms affecting the image quality and generally is large in volume. The invention therefore provides a beam splitting and combining device (BSC device) to address the described problems.

A BSC device in accordance with an embodiment of the invention includes a first prism, a second prism and a first optical film. The first prism includes a first surface, a second surface and a third surface. The second prism includes a fourth surface, a fifth surface and a sixth surface. The fifth surface and the second surface are attached to each other. The first optical film is formed between the second surface and the fifth surface by coating. The first surface allows a beam in a first range of wavelengths to pass through. The fourth surface allows a beam in a second range of wavelengths to pass through. The first optical film allows the beam in the first range of wavelengths to pass through, and reflects the beam in the second range of wavelengths. The sixth surface allows the beams in the first and second ranges of wavelengths to pass through and reflects a beam in a third range of wavelengths. The beam in the first range of wavelengths is configured to pass through the first surface, the second surface, the first optical film, the fifth surface and the sixth surface in order or in reverse order, or is configured to pass through the first surface and the third surface in order or in reverse order.

In another embodiment, the BSC device includes a first prism and a second prism attached to each other. The first prism includes a first surface, a second surface and a third surface. The first surface allows a beam in a first range of wavelengths to pass through.

The second prism includes a fourth surface, a fifth surface and a sixth surface. The fifth surface and the second surface are attached to each other. A first optical film is formed between the fifth surface and the second surface by coating. The first optical film allows the beam in the first range of wavelengths to pass through, and reflects a beam in a second range of wavelengths. The first surface and the second surface have an included angle of 45 degrees therebetween. The fourth surface is perpendicular to the first surface. The fifth surface and the fourth surface have an included angle of 45 degrees therebetween. The sixth surface and the first surface have an included angle of 45 degrees therebetween.

In yet another embodiment, the BSC device includes a prism. The prism includes a first surface, a second surface and a third surface. The first surface allows a beam in a first range of wavelengths to pass through, and reflects a beam in a second range of wavelengths. The beam in the second range of wavelengths is incident on the second surface. The third surface allows the beam in the first range of wavelengths to pass through and reflects the beam in the third range of wavelengths. The beam in the first range of wavelengths is configured to pass through the first surface and the third surface in order or in reverse order. The beam in the second range of wavelengths is configured to pass through the second surface, to reach the first surface and to be reflected on the first surface, or is configured to be reflected on the first surface, to reach the second surface and to pass through the second surface. The beam in the third range of wavelengths is reflected on the third surface.

In another embodiment, the third surface and the sixth surface are in parallel or coplanar. The third surface allows the beam in the first range of wavelengths to pass through and reflects the beam in the third range of wavelengths. A part of the beam in the first range of wavelengths is able to pass through the first surface and the third surface in order or in reverse order. Another part of the beam in the third range of wavelengths is reflected on the third surface.

In yet another embodiment, the BSC device further includes a third prism. The third prism includes a seventh surface, an eighth surface, a ninth surface, a tenth surface and an eleventh surface. The seventh surface allows the beam in the third range of wavelengths to pass through. The eighth surface and the sixth surface are attached to each other. A second optical film is sandwiched between the sixth surface and the eighth surface. The second optical film allows the beam in the first range of wavelengths to pass through and reflects the beam in the third range of wavelengths. The ninth surface allows the beams in the first, second and third ranges of wavelengths to pass through. The third surface and the sixth surface are disposed in parallel or are coplanar. The third surface allows the beam in the first range of wavelengths to pass through and reflects the beam in the third range of wavelengths. The tenth surface allows the beam in the second range of wavelengths to pass through. The eleventh surface allows the beam in the first range of wavelengths to pass through and reflects the beam in the second range of wavelengths.

In another embodiment, the beam in the first range of wavelengths passes through the first surface, the third surface, the eleventh surface, and the ninth surface in order or in reverse order, and/or passes through the first surface, the second surface, the first optical film, the fifth surface, the sixth surface, the second optical film, the eighth surface and the ninth surface in order or in reverse order. The beam in the second range of wavelengths passes through the tenth surface, is reflected on the eleventh surface, and passes through the ninth surface in order or in reverse order, and/or passes through the fourth surface, reaches the fifth surface, is reflected on the first optical film, passes through the sixth surface, passes through the second optical film, passes through the eighth surface and passes through the ninth surface in order or in reverse order. The beam in the third range of wavelengths is reflected on the third surface, passes through the eleventh surface, and passes through the ninth surface in order or in reverse order, or passes through the seventh surface, reaches the eighth surface, is reflected on the second optical film and passes through the ninth surface in order or in reverse order.

In yet another embodiment, the BSC device further includes a third prism. The third prism includes a seventh surface, an eighth surface and a ninth surface. The seventh surface allows the beam in the third range of wavelengths to pass through. The eighth surface and the third surface are attached to each other. A second optical film is formed between the third surface and the eighth surface by coating. The second optical film allows the beam in the first range of wavelengths to pass through, and reflects the beam in the third range of wavelengths. The ninth surface allows the beam in the first range of wavelengths to pass through, and reflects the beam in the second range of wavelengths. The third surface and the sixth surface are disposed in parallel or are coplanar. The third surface allows the beam in the first range of wavelengths to pass through and reflects the beam in the third range of wavelengths. The beam in the first range of wavelengths passes through the first surface, the second surface, the first optical film, the fifth surface, and the sixth surface in order or in reverse order, or passes through the first surface, the third surface, the second optical film, the eighth surface and the ninth surface in order or in reverse order. The beam in the second range of wavelengths passes through the fourth surface, is reflected on the first optical film formed between the fifth surface and the second surface, and passes through the sixth surface in order or in reverse order, or is reflected on the ninth surface. The beam in the third range of wavelengths passes through the seventh surface, is reflected on the second optical film formed between the eighth surface and the third surface, and passes through the ninth surface in order or in reverse order, or is reflected on the sixth surface.

In another embodiment, the first prism is a square pyramidal prism, the first surface is a bottom surface of the first prism, the second prism is a triangular pyramidal prism, the third prism is a triangular pyramidal prism, and the ninth surface and the fifth surface are disposed in parallel or are coplanar.

In yet another embodiment, the first prism is a square pyramidal prism and further includes a seventh surface allowing the beam in the second range of wavelengths to pass through, and an eighth surface allowing the beam in the third range of wavelengths to pass through. The second prism is a triangular pyramidal prism and further includes a ninth surface allowing the beam in the third range of wavelengths to pass through. A part of the beam in the first range of wavelengths passes through the first surface, the second surface, the first optical film, the fifth surface, and the sixth surface in order or in reverse order. Another part of the beam in the first range of wavelengths passes through the first surface and the third surface in order or in reverse order. The beam in the second range of wavelengths passes through the first surface, is reflected on the first optical film formed between the second surface and the fifth surface, and passes through the seventh surface in order or in reverse order. A part of the beam in the third range of wavelengths passes through the first surface, is reflected on the third surface, and passes through the eighth surface in order or in reverse order.

In another embodiment, the BSC device further includes a fourth prism. The fourth prism includes a twelfth surface, a thirteenth surface, a fourteenth surface, and a fifteenth surface. The twelfth surface allows the beam in the third range of wavelengths to pass through. The thirteenth surface and the eleventh surface are attached to each other. A third optical film is provided between the thirteenth surface and the eleventh surface by coating. The third optical film allows the beam in the first range of wavelengths to pass through and reflects the beam in the second range of wavelengths. The fourteenth surface allows the beam in the first range of wavelengths to pass through and reflects the beam in the second range of wavelengths. The fifteenth surface and the third surface are attached to each other. A fourth optical film is provided between the fifteenth surface and the third surface by coating. The fourth optical film allows the beam in the first range of wavelengths to pass through and reflects the beam in the third range of wavelengths. The beam in the first range of wavelengths passes through the first surface, the second surface, the first optical film, the fifth surface, the sixth surface, the second optical film, the eighth surface and the ninth surface in order or in reverse order, and/or passes through the first surface, the third surface, the fourth optical film, the fifteenth surface, the thirteenth surface, the third optical film, the eleventh surface and the ninth surface in order or in reverse order. The beam in the second range of wavelengths passes through the fourth surface, reaches the fifth surface, is reflected on the first optical film, passes through the sixth surface, passes through the second optical film, passes through the eighth surface and passes through the ninth surface in order or in reverse order, or passes through the tenth surface, is reflected on the third optical film formed between the thirteenth surface and the eleventh surface, and passes through the ninth surface in order or in reverse order. The beam in the third range of wavelengths passes through the seventh surface, reaches the eighth surface, is reflected on the second optical film, and passes through the ninth surface in order or in reverse order, or passes through the twelfth surface, is reflected on the fourth optical film formed between the fifteenth surface and the third surface, passes through the eleventh surface and passes through the ninth surface in order or in reverse order.

In yet another embodiment, the first prism is a square pyramidal prism, the first surface is a bottom surface of the first prism, the second prism is a triangular pyramidal prism, the third prism is a square pyramidal prism, the ninth surface is a bottom surface of the third prism, and the fourth prism is a triangular pyramidal prism.

In another embodiment, any two of the first, second and third ranges do not overlap. The BSC device satisfies at least one of the following conditions (1) and (2). (1) any wavelength of the beam in the first range and that in the second range have a difference greater than 20 nm, any wavelength of the beam in the second range and that in the third range have a difference greater than 20 nm, and any wavelength of the beam in the third range and that in the first range have a difference greater than 20 nm; (2) the third range is not between the first range and the second range.

A projector in accordance with an embodiment of the invention includes a light source, the above-mentioned BSC device, a spatial light modulator, and a projection lens.

A head-mounted display in accordance with an embodiment of the invention includes a light source, the above-mentioned BSC device and a projection lens.

A head-up display in accordance with an embodiment of the invention includes a light source, a projection lens, a reflective mirror, a spatial light modulator, and the above-mentioned BSC device.

The BSC device has the following merits: when the prisms are attached to each other, gaps can be merely formed at the corners of the prisms. It can be avoided that gaps are formed between prisms to affect the propagation of beams when the beams are incident on the surfaces of the prisms. Such arrangement can effectively avoid the influence on the formed images due to arrival of the incident beam at the gaps. Further, the volume and weight of the BSC device can be reduced that benefits miniaturization of the whole structure.

In the invention, the above-mentioned projection lens has a reduced volume, an enlarged field of view and a reduced F-number and is still capable of good optical performance.

The projection lens in accordance with an embodiment of the invention includes a first lens, a second lens, a third lens, a fourth lens and a fifth lens. The first lens is with refractive power. The second lens is with refractive power. The third lens is with refractive power. The fourth lens is with refractive power. The fifth lens is with negative refractive power and includes a concave surface facing an image source side. The first, second, third, fourth and fifth lenses are sequentially arranged from a projection side to the image source side along an optical axis. The second lens and the third lens are cemented together, to form a cemented lens which is with positive refractive power.

In another embodiment, the projection lens further includes a stop disposed between the projection side and the first lens. The first lens is with positive refractive power and includes a convex surface facing the image source side. The second lens is with negative refractive power and includes a concave surface facing the projection side and another concave surface facing the image source side. The third lens is with positive refractive power and includes a convex surface facing the projection side and another convex surface facing the image source side. The fourth lens is with positive refractive power and includes a convex surface facing the projection side and another convex surface facing the image source side. The fifth lens further includes a concave surface facing the projection side.

In yet another embodiment, the first lens further includes a concave surface or a convex surface facing the projection side. The fourth lens and the fifth lens are cemented together.

In another embodiment, the projection lens satisfies any one of the following conditions: $1.9 \leq f_1/f \leq 3.7$; $-1.1 \leq f_2/f \leq -0.6$; $0.8 \leq f_3/f \leq 1.2$; $0.8 \leq f_4/f \leq 1.1$, where $f_1$ is an effective focal length of the first lens, $f_2$ is an effective focal length of the second lens, $f_3$ is an effective focal length of the third lens, $f_4$ is an effective focal length of the fourth lens, and f is an effective focal length of the projection lens.

In yet another embodiment, the projection lens satisfies any one of the following conditions: $-17 \leq f_{23}/f_5 \leq 30$; $-1.15 \leq f_4/f_5 \leq -0.75$; $-33 \leq f_{23}/f \leq 16$ where $f_4$ is an effective focal length of the fourth lens, $f_5$ is an effective focal length of the fifth lens, $f_{23}$ is an effective focal length of combination of the second lens and the third lens, and f is an effective focal length of the projection lens.

In another embodiment, the projection lens satisfies any one of the following conditions: $0.3 \leq f/TTL \leq 0.45$; $0.09 \leq BFL/TTL \leq 0.22$; $0.5 \leq IH/f \leq 0.65$ where f is an effective focal length of the projection lens, TTL is an interval from the stop to the image source along the optical axis, BFL is an interval from the image source side surface to the image source along the optical axis, and IH is a half image height of the projection lens.

In yet another embodiment, the projection lens satisfies the following conditions: $-1.2 \leq f_5/f \leq -0.9$ where $f_5$ is an effective focal length of the fifth lens, and f is an effective focal length of the projection lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIGS. 14A and 14B are respectively a schematic diagram and a light path diagram of a BSC device in accordance with the eleventh embodiment of the invention.

FIG. 15 is a schematic diagram of a projector including a BSC device of the invention.

DETAILED DESCRIPTION OF THE INVENTION

The purpose, technical scheme and merits of the invention can be fully understood by reading the subsequent detailed description and examples with references made to the accompanying drawings. It is understood that this description is made for the purpose of illustrating the invention and should not be taken in a limiting sense.

Figure 1:
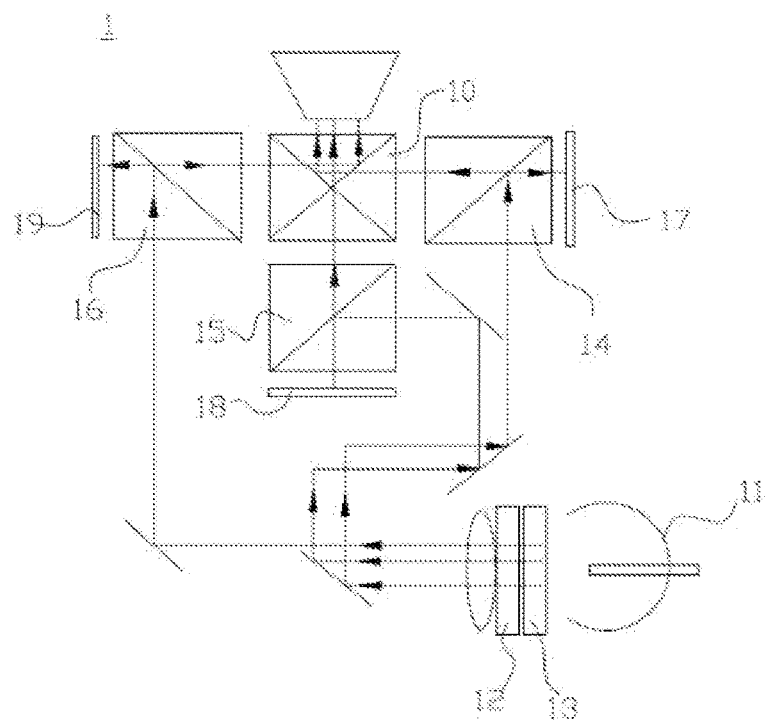
FIG. 1 is a schematic diagram of a conventional liquid crystal on silicon (LCOS) projector.
Figure 2:
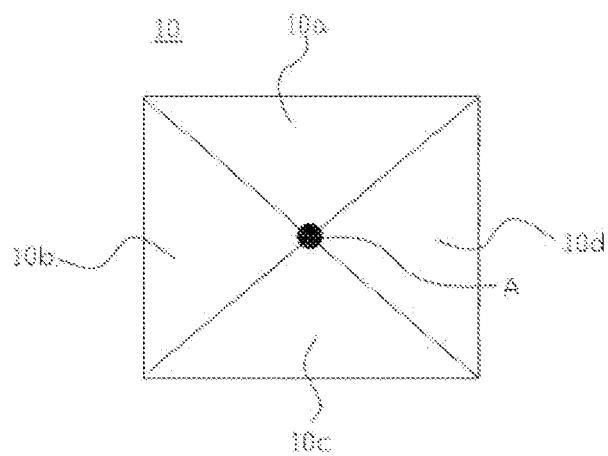
FIG. 2 is a schematic diagram of the beam-combining prism of FIG. 1.
Figure 3:
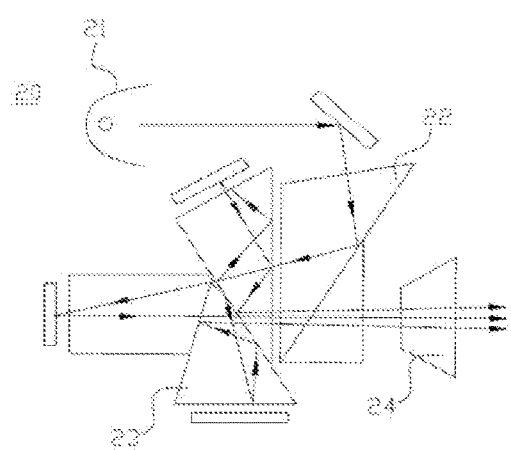
FIG. 3 is a schematic diagram of a known digital light processing (DLP) projector.
Figure 4A:
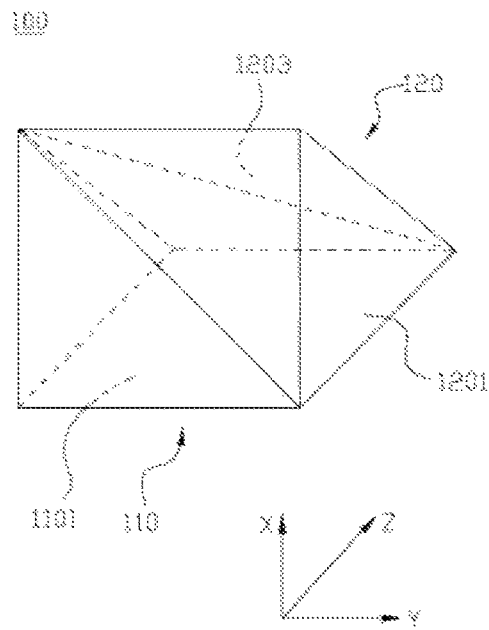
FIGS. 4A, 4B and 4C are respectively a schematic diagram, an exploded diagram and a light path diagram of a beam splitting and combining device (BSC device) in accordance with the first embodiment of the invention.
Figure 4B:
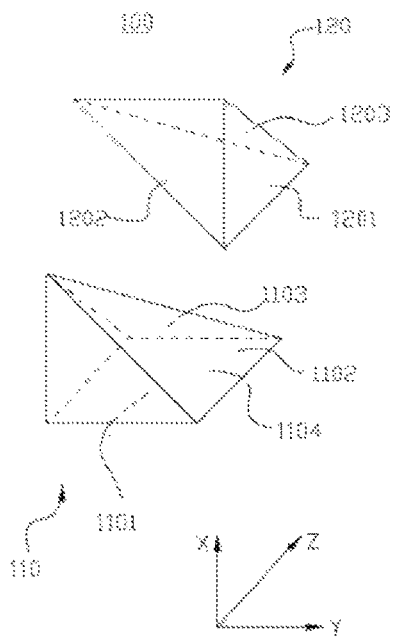
Figure 4C:
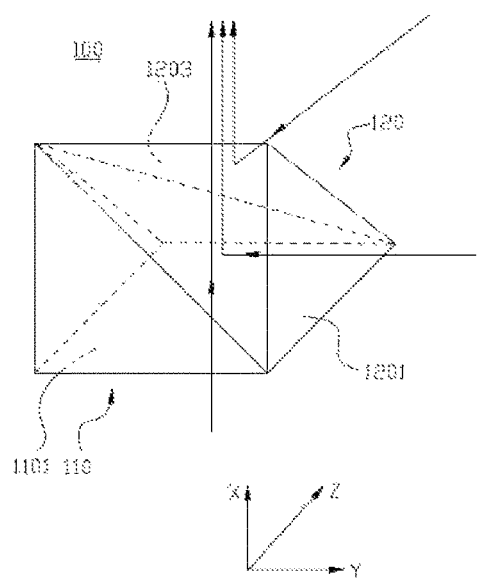

FIGS. 4A, 4B and 4C are respectively a schematic diagram, an exploded diagram and a light path diagram of a beam splitting and combining device (hereinafter BSC device) in accordance with the first embodiment of the invention. As shown in FIGS. 4A-4C, in the first embodiment, the BSC device 100 includes a first prism 110 and a second prism 120 connected to each other. The first prism 110 includes a first surface 1101 allowing a beam in a first range of wavelengths to pass through along a first direction X, a second surface 1102 allowing the beam in the first range of wavelengths to pass through and reflecting a beam in a second range of wavelengths, and a third surface 1103 allowing the beam in the first range of wavelengths to pass through and reflecting a beam in a third range of wavelengths. The second surface 1102 and the third surface 1103 are adjacent to each other. When observed in the first direction X, the second surface 1102 and the third surface 1103 are shaded from view by the first surface 1101.

The second prism 120 includes a fourth surface 1201 allowing the beam in the second range of wavelengths to pass through, a fifth surfaced 1202 contacting the second surface 1102, allowing the beam in the first range of wavelengths to pass through and reflecting the beam in the second range of wavelengths, and a sixth surface 1203 allowing the beams in the first and second ranges of wavelengths to pass through and reflecting the beam in the third range of wavelengths. The fourth, fifth and sixth surfaces 1201, 1202 and 1203 are adjacent to each other. The third surface 1103 and the sixth surface 1203 may be disposed in parallel or be coplanar. Further, the third surface 1103 and the sixth surface 1203 may be parallel to the second direction Y.

The second surface 1102 and the fifth surface 1202 may be glued together with a first optical film 1104 sandwiched therebetween. The first optical film 1104 may be coated on the second surface 1102 or on the fifth surface 1202. By either arrangement, the beam in the second range of wavelengths can be reflected thereon. The first optical film 1104 is provided for allowing the beam in the first range of wavelengths to pass through and for reflecting the beam in the second range of wavelengths. An optical film is coated on the sixth surface 1203 for allowing the beams in the first and second range of wavelengths to pass through and for reflecting the beam in the third range of wavelengths. The first, second and third ranges of wavelengths may respectively be one of the following ranges: 380 nm-450 nm (purple), 450 nm-475 nm (blue), 476 nm-495 nm (cyan), 495 nm-570 nm (green), 570 nm-590 nm (yellow), 590 nm-620 nm (orange), 620 nm-750 nm (red), all of which are wavelengths of visible light. However, the invention is not limited thereto. Preferably, any two of the first, second and third ranges of wavelengths do not overlap. Further, at least one of the following conditions is satisfied: a difference between any two wavelengths in the first, second and third ranges is greater than 20 nm, and the third range is not between the first range and the second range.

The light path of the first embodiment is described as follows; As shown, the beam in the first range of wavelengths which is incident in the first direction X sequentially passes through the first surface 1101, the second surface 1102, the first optical film 1104, the fifth surface 1202 and the sixth surface 1203, and is emitted in the first direction X. The beam in the second range of wavelengths which is incident in the second direction Y passes through the fourth surface 1201, is reflected on the first optical film 1104 provided between the second surface 1102 and the fifth 1202, passes through the sixth surface 1203, and is emitted in the first direction X. The beam in the third range of wavelengths which is incident in the third direction Z reaches the sixth surface 1203, is reflected on the sixth surface 1203, and is emitted in the first direction X. Thus, the beam in the first, second and third ranges of wavelengths are combined.

The above-mentioned propagation of the beams can be reversed, described as follows: A combined beam is incident on the sixth surface 1203 in the first direction X. The beam in the first range of wavelengths passes through the sixth surface 1203, the fifth surface 1202, the first optical film 1104, the second surface 1102, and the first surface 1101 and is emitted in the first direction X. The beam in the second range of wavelengths passes through the sixth surface 1203, reaches the fifth surface 1202, is reflected on the first optical film 1104, and is emitted from the fourth surface 1201 in the second direction Y. The beam in the third range of wavelengths is reflected on the sixth surface 1203 and is emitted in the third direction Z. Thus, the combined beam is split into three beams in the first, second and third ranges of wavelengths.

When the area onto which the beam is incident is relatively large or the size of the BSC device is relatively small, the beams in the first and third ranges of wavelengths may simultaneously reaches plural surfaces. Under such circumstance, the beam in the first range of wavelengths which is incident in the first direction passes through the first surface 1101. A part of the beam in the first range of wavelengths sequentially passes through the second surface 1102, the first optical film 1104, the fifth surface 1202 and the sixth surface 1203 and is emitted in the first direction X. Another part of the beam in the first range of wavelengths passes through the third surface 1103 and is emitted in the first direction X. The beam in the second range of wavelengths which is incident in the second direction Y passes through the fourth surface 1201, is reflected on the first optical film 1104 provided between the second surface 1102 and the fifth surface 1202 and passes through the sixth surface 1203, and is emitted in the first direction X. A part of the beam in the third range of wavelengths which is incident in the third direction Z is reflected on the sixth surface 1203 and is emitted in the first direction X, while another part of the beam in the third range of wavelengths which is incident in the third direction Z is reflected on the third surface 1103 and is emitted in the first direction X. The emitted beams in the first and second ranges of wavelengths and the reflected beam in the third range of wavelengths are combined and emitted. Thus, combination of the beams in the first, second and third ranges of wavelengths is performed. The above embodiment can be modified in which the beam is arranged without passing through the third surface 1103.

When the propagation of the beams described above is reverse, operation of beam splitting is performed. In detail, a combined beam which is incident in the first direction X reaches the sixth surface 1203 and the third surface 1103. A part of the beam in the first range of wavelengths sequentially passes through the sixth surface 1203, the fifth surface 1202, the first optical film 1104, the second surface 1102 and the first surface 1101, and is emitted in the first direction X, while another part of the beam in the first range of wavelengths passes through the third surface 1103 and is emitted from the first surface 1101 in the first direction X. The beam in the second range of wavelengths passes through the sixth surface 1203, reaches the fifth surface 1202, is reflected on the first optical film 1104 and is emitted from the fourth surface 1201 in the second direction Y. A part of the beam in the third range of wavelengths is reflected on the sixth surface 1203 and is emitted in the third direction Z, while another part of the beam in the third range of wavelengths is reflected on the third surface 1103 and is emitted in the third direction Z. Thus, splitting a combined beam into three beams in the first, second and third ranges of wavelengths is performed.

In the above embodiment shown in FIGS. 4A-4C, the first prism 110 is a square pyramidal prism and the first surface 1101 is the bottom surface thereof. The second prism 120 is a triangular pyramidal prism. The first, second and third directions are perpendicular to each other. The first surface 1101 and the second surface 1102 have an included angle of 45 degrees therebetween. The first surface 1101 and the third surface 1103 have an included angle of 45 degrees therebetween. The fourth surface 1201 is perpendicular to the first surface 1101. The fifth surface 1202 and the fourth surface 1201 have an included angle of 45 degrees therebetween. The sixth surface 1203 and the first surface 1101 have an included angle of 45 degrees therebetween. However, the invention is not limited to the above embodiment. The angles between the surfaces may be changed and the incident direction of the beam may be changed, to perform the operation of splitting and combining the beams in the first, second and third ranges of wavelengths. In addition, the forms of the first prism 110 and the second prism 120 may be changed.

In the above embodiment, the BSC device 100 merely has two prisms, namely the first prism 110 and the second prism 120. The first prism 110 and the second prism 120 are connected, with the second surface 1102 and the fifth surface 1202 contacting each other. Therefore, where gaps can be formed is only at the corners of the first prism 110 and the second prism 120. Such arrangement can effectively avoid the negative influence on the formed images due to arrival of the incident beam at the gaps. Further, the volume and weight of the BSC device can be reduced, which benefits miniaturization of the projector.

Figure 5A:
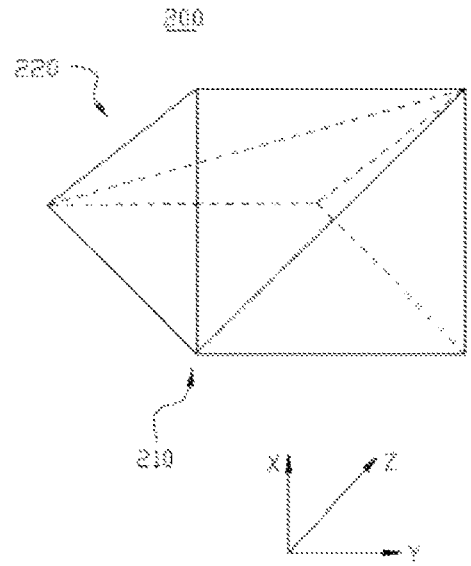
FIGS. 5A, 5B and 5C are respectively a schematic diagram, an exploded diagram and a light path diagram of a BSC device in accordance with the second embodiment of the invention.
Figure 5B:
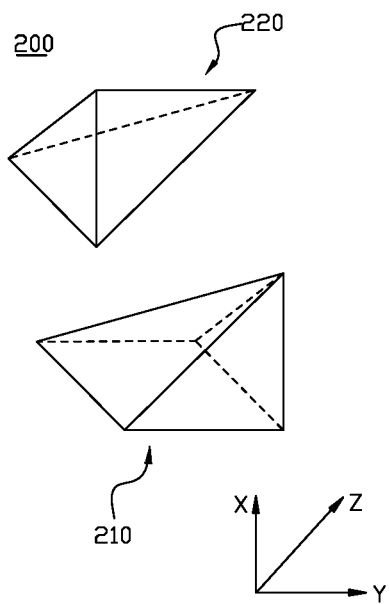
Figure 5C:
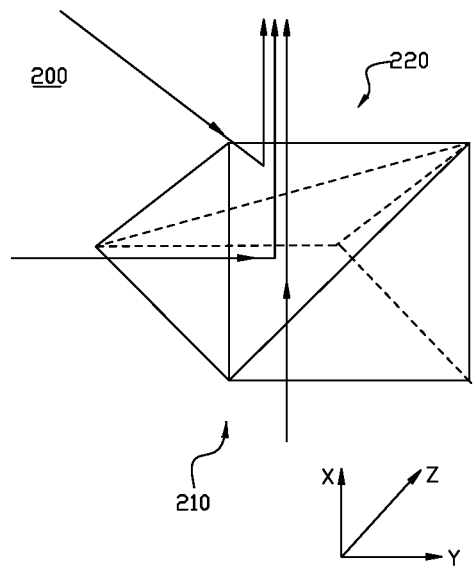

FIGS. 5A, 5B and 5C are respectively a schematic diagram, an exploded diagram and a light path diagram of a BSC device in accordance with the second embodiment of the invention. As shown in FIG. 5A-5C, the second embodiment is a modification of the first embodiment. In the second embodiment, the BSC device 200 includes a first prism 210 and a second prism 220. The BSC device 200 of the second embodiment and the BSC device 100 of the first embodiment are structurally symmetrical with respect to the first direction X. Therefore, description of the part of the second embodiment same as or similar to that of the second embodiment is omitted.

Figure 6A:
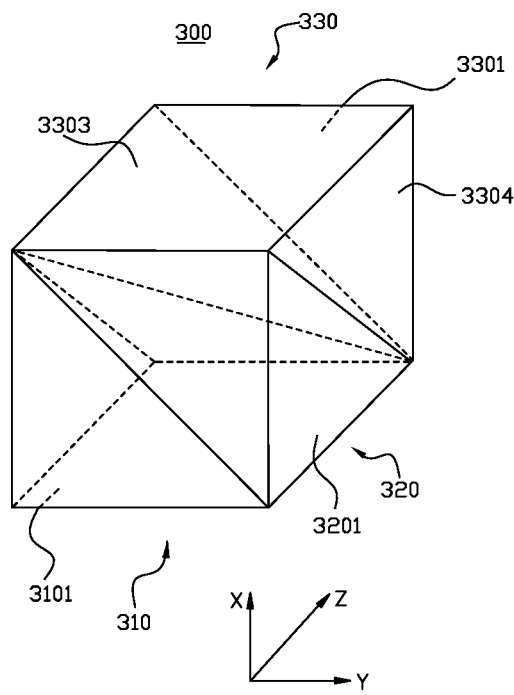
FIG. 6A is a schematic diagram of a BSC device in accordance with the third embodiment of the invention.
Figure 6B:
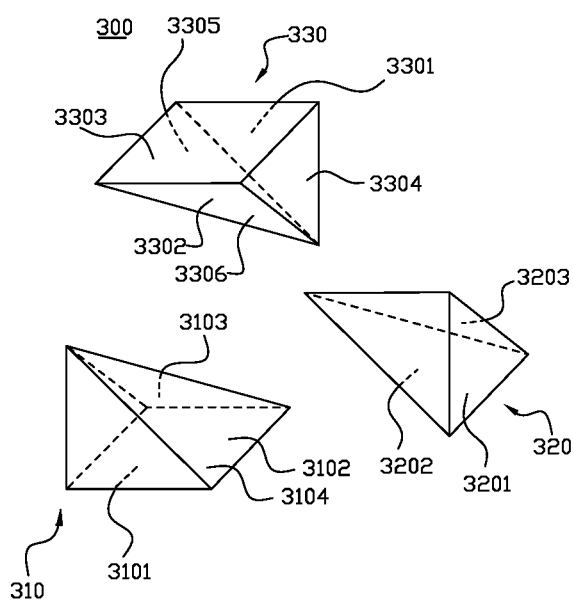
FIG. 6B is an exploded diagram of the BSC device in accordance with the third embodiment of the invention.
Figure 6C:
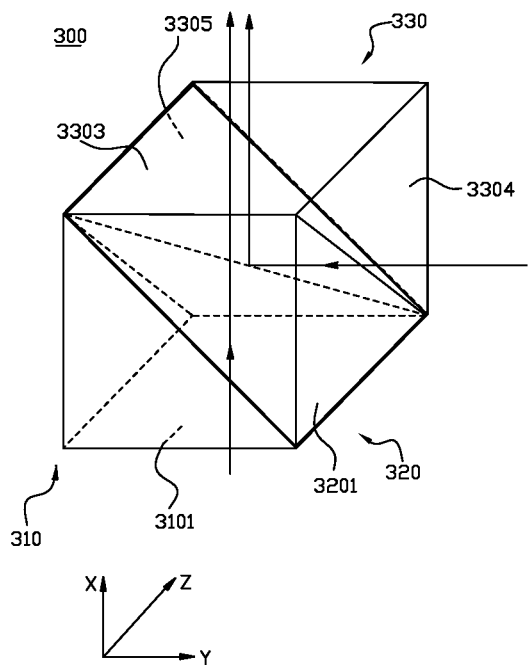
FIG. 6C depicts the light paths of the beams in the first and second ranges of wavelengths for the BSC device in accordance with the third embodiment of the invention.
Figure 6D:
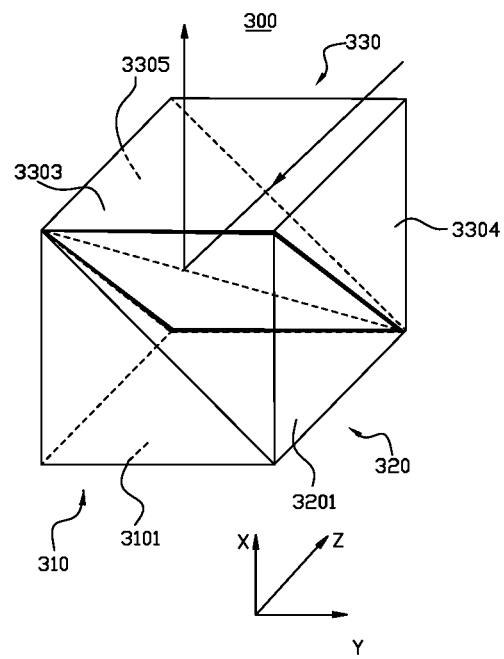
FIG. 6D depicts the light path of the beam in the third range of wavelengths for the BSC device in accordance with the third embodiment of the invention.
Figure 6E:
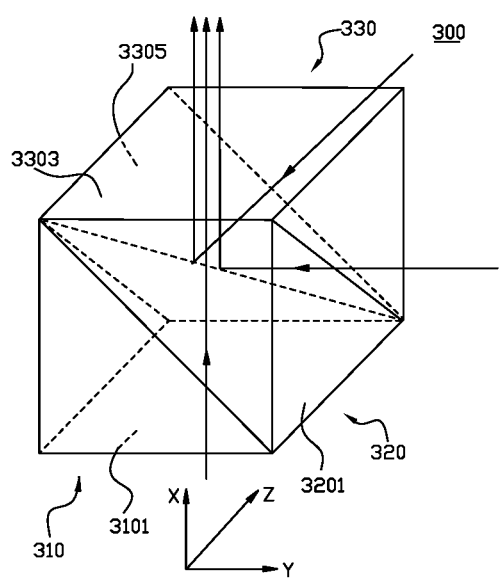
FIG. 6E depicts the light paths for the BSC device in accordance with the third embodiment of the invention.

FIGS. 6A and 6B are respectively a schematic diagram and an exploded diagram of a BSC device in accordance with the third embodiment of the invention, FIG. 6C depicts the light paths of the beams in the first and second ranges of wavelengths for the BSC device in accordance with the third embodiment of the invention, FIG. 6D depicts the light path of the beam in the third range of wavelengths for the BSC device in accordance with the third embodiment of the invention, and FIG. 6E depicts the light paths for the BSC device in accordance with the third embodiment of the invention. The third embodiment is a modification of the first embodiment. Therefore, description of the parts of the third embodiment same as that of the first embodiment is omitted. As shown in FIGS. 6A-6E, in the third embodiment, the BSC device 300 includes a first prism 310, a second prism 320 and a third prism 330 connected to each other. The first prism 310 includes a first surface 3101 allowing a beam in a first range of wavelengths to pass through, a second surface 3102 allowing the beam in the first range of wavelengths to pass through and reflecting a beam in a second range of wavelengths, and a third surface 3103 allowing the beam in the first range of wavelengths to pass through and reflecting a beam in a third range of wavelengths. The second surface 3102 and the third surface 3103 are adjacent to each other. When observed in the first direction X, the second surface 3102 and the third surface 3103 are shaded from view by the first surface 3101.

The second prism 320 includes a fourth surface 3201 allowing the beam in the second range of wavelengths to pass through, a fifth surfaced 3202 contacting the second surface 3102, allowing the beam in the first range of wavelengths to pass through and reflecting the beam in the second range of wavelengths, and a sixth surface 3203 allowing the beams in the first and second ranges of wavelengths to pass through and reflecting the beam in the third range of wavelengths. The fourth, fifth and sixth surfaces 3201, 3202 and 3203 are adjacent to each other.

The third prism 330 is a square pyramidal prism and includes a seventh surface 3301 allowing the beam in the third range of wavelengths to pass through, an eighth surface 3302 contacting the sixth surface 3301, opposing the seventh surface 3301, allowing the beams in the first and second ranges of wavelengths to pass through and reflecting the beam in the third range of wavelengths, a ninth surface 3303 being the bottom surface of the third prism and allowing the beams in the first, second and third ranges of wavelengths to pass through, a tenth surface 3304 allowing the beam in the second range of wavelengths to pass through, and an eleventh surface opposing the tenth surface 3304, allowing the beams in the first and third ranges of wavelengths to pass through and reflecting the beam in the second range of wavelengths. When observed in the first direction X, the seventh surface 3301, the eighth surface 3302, the tenth surface 3304 and the eleventh 3305 are shaded from view by the ninth surface 3303.

The second surface 3102 and the fifth surface 3202 can be connected by gluing. A first optical film 3104 is provided between the second surface 3102 and the fifth surface 3202 by coating. The first optical film 3104 may be coated on the second surface 3102 or the fifth surface 3202. The first optical film 3104 allows the beam in the first range of wavelengths to pass through and reflects the beam in the second range of wavelengths.

The sixth surface 3203 and the eighth surface 3302 can be connected by gluing. A second optical film 3306 is provided between the sixth surface 3203 and the eighth surface 3302. The second optical film 3306 may be coated on the sixth surface 3203 or on the eighth surface 3302, to reflect the beam in the third range of wavelengths thereon. The second optical film 3306 allows the beams in the first and second ranges of wavelengths to pass through and reflects the beam in the third range of wavelengths.

The fourth surface 3201 and the tenth surface 3304 may be disposed in parallel or be coplanar. The eleventh surface 3305 and the fifth surface 3202 may be disposed in parallel or be coplanar. The sixth surface 3203 and the third surface 3103 may be disposed in parallel or be coplanar. Further, the sixth surface 3203 and the third surface 3103 are parallel to the direction in which the beam in the second range of wavelengths passes through the fourth surface 3201. In FIG. 6C, the eleventh surface 3305 and the fifth surface 3202 (or the second surface 3102) are represented by bold lines, both of which are the reflective surfaces reflecting the beam in the second range of wavelengths and are parallel to the third direction Z. In FIG. 6D, the sixth surface 3203 (or the eighth surface 3302) and the third surface 3103 are represented by bold lines, both of which are reflective surfaces reflecting the beam in the third range of wavelengths and are parallel to the second direction Y.

The light paths in the third embodiment are described as follows: As shown, the beam in the first range of wavelengths which is incident in the first direction X sequentially passes through the first surface 3101, the second surface 3102, the first optical film 3104, the fifth surface 3202, the sixth surface 3203, the second optical film 3306 and the eighth surface 3302, and is emitted from the ninth surface 3303 in the first direction X. The beam in the second range of wavelengths which is incident in the second direction Y passes through the fourth surface 3201, is reflected on the first optical film 3104, passes through the sixth surface 3203, the second optical film 3306 and the eighth surface 3302, and is emitted from the ninth surface 3303 in the first direction X. The beam in the third range of wavelengths which is incident in the third direction Z passes through the seventh surface 3301, reaches the eighth surface 3302, is reflected on the second optical film 3306, and is emitted from the ninth surface 3303 in the first direction X. The above-mentioned propagation of the beams can be reversed: The beam in the first range of wavelengths sequentially passes through the ninth surface 3303, the eighth surface 3302, the second optical film 3306, the sixth surface 3203, the fifth surface 3202, the first optical film 3104 and the second surface 3102, and is emitted from the first surface 3303 in the first direction X. The beam in the second range of wavelengths sequentially passes through the ninth surface 3303, the eighth surface 3302, the second optical film 3306 and the sixth surface 3203, is reflected on the first optical film 3104 provided between the second surface 3102 and the fifth surface 3202, and is emitted from the fourth surface 3201 in the second direction Y. The beam in the third range of wavelengths passes through the ninth surface 3303 and the eighth surface 3302, is reflected on the second optical film 3306 to the seventh surface 3301, and is emitted from the seventh surface 3301 in the third direction Z.

When the area onto which the beam is incident is relatively large or the size of the BSC device is relatively small, the beams in the first and third ranges of wavelengths may simultaneously reaches plurality surfaces. Under such circumstance, a part of the beam in the first direction X sequentially passes through the first surface 3101, the second surface 3102, the first optical film 3104, the fifth surface 3202, the sixth surface 3203, the second optical film 3306 and the eighth surface 3302, and is emitted from the ninth surface 3303 in the first direction X. Another part of the beam in the first range of wavelengths which is incident in the first direction X passes through the third surface 3103 and the eleventh surface 3305 and is emitted from the ninth surface 3303 in the first direction X.

A part of the beam in the second range of wavelengths which is incident in the second direction Y passes through the fourth surface 3201, is reflected on the first optical film 3104, passes through the sixth surface 3203, the second optical film 3306 and the eighth surface 3302, and is emitted from the ninth surface 3303 in the first direction X. Another part of the beam in the second range of wavelengths which is incident in the second direction Y passes through the tenth surface 3304, is reflected on the eleventh surface 3305, and is emitted from the ninth surface 3303 in the first direction X.

A part of the beam in the third range of wavelengths which is incident in the third direction Z passes through the seventh surface 3301, reaches the eighth surface 3302, is reflected on the second optical film 3306 to the ninth surface 3303 and is emitted from the ninth surface 3303 in the first direction X. Another part of the beam in the third range of wavelengths which is incident in the third direction Z is reflected on the third surface 3103 to the eleventh surface 3305, passes through the eleventh surface 3305, and is emitted from the ninth surface 3303 in the first direction X. Thus, combination of the beams in the first, second and third ranges of wavelengths is performed.

Reverse propagation of the beams is described as follows: A combined beam is incident on the ninth surface 3303. A part of the beam in the first range of wavelengths sequentially passes through the eighth surface 3302, the second optical film 3306, the sixth surface 3203, the fifth surface 3202, the first optical film 3104, the second surface 3102, and is emitted from the first surface 3303 in the first direction X. Another part of the beam in the first range of wavelengths sequentially passes through the ninth surface 3303, the eleventh surface 3305, the third surface 3103 and is emitted from the first surface 3101 in the first direction X. A part of the beam in the second range of wavelengths sequentially passes through the ninth surface 3303, the eighth surface 3302, the second optical film 3306, the sixth surface 3203, is reflected on the first optical film 3104 provided between the second surface 3102 and the fifth surface 3202, and is emitted from the fourth surface 3201 in the second direction Y. Another part of the beam in the second range of wavelengths passes through the ninth surface 3303, is reflected on the eleventh surface 3305, and is emitted from the tenth surface 3304 in the second direction Y. A part of the beam in the third range of wavelengths passes through the ninth surface 3303 and the eleventh surface 3305, reaches the third surface 3103, and is reflected on the third surface 3103 in the third direction Z. Another part of the beam in the third range of wavelengths passes through the ninth surface 3303, reaches the eighth surface 3302, is reflected on the second optical film 3306, and is emitted from the seventh surface 3301 in the third direction Z. Thus, splitting a combined beam into three beams in the first, second and third ranges of wavelengths is performed. In the third embodiment, the beam may be arranged without passing through the third surface 3103. Alternatively, the beam may be arranged without passing through the second prism 320.

In the third embodiment shown in FIGS. 6A-6E, the first prism 310 is a square pyramidal prism and the first surface 3101 is the bottom surface of the first prism 310. The second prism 320 is a triangular pyramidal prism. The third prism 330 is a square pyramidal prism and the ninth surface 3303 is the bottom surface of the third prism 330. The first direction X, the second direction Y and the third direction Z are perpendicular to each other. The first surface 3101 and the second surface 3102 have an included angle of 45 degrees therebetween. The first surface 3101 and the third surface 3103 also have an included angle of 45 degrees therebetween. The fourth surface 3201 is perpendicular to the first surface 3101. The sixth surface 3203 and the first surface 3101 have an included angle of 45 degrees therebetween. The seventh surface 3301 and the first surface 3101 have an included angle of 90 degrees therebetween. The eighth surface 3302 and the first surface 3101 have an included angle of 45 degrees therebetween. The ninth surface 3303 and the first surface 3101 are disposed in parallel. The tenth surface 3304 is perpendicular to the first surface 3101.

However, the invention is not limited to the above embodiment. The angles between the surfaces may be changed and the incident direction of the beam may be changed, to perform the operation of splitting and combining the beams in the first, second and third ranges of wavelengths. In addition, the forms of the first prism 310, the second prism 320 and the third prism 330 may be changed.

Figure 7A:
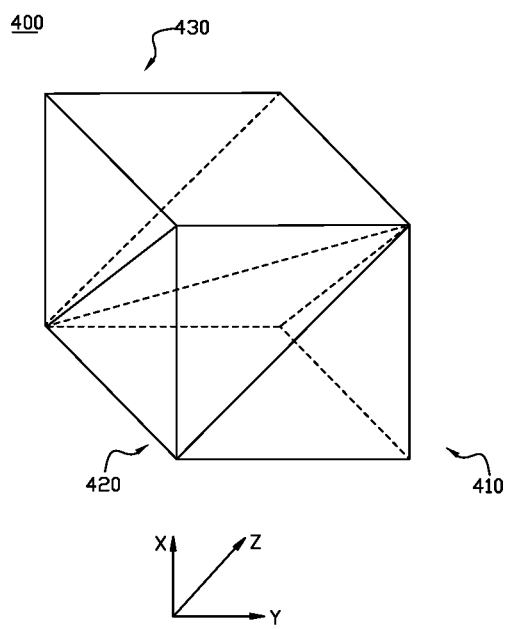
FIGS. 7A, 7B and 7C are respectively a schematic diagram, an exploded diagram and a light path diagram of a BSC device in accordance with the fourth embodiment of the invention.
Figure 7B:
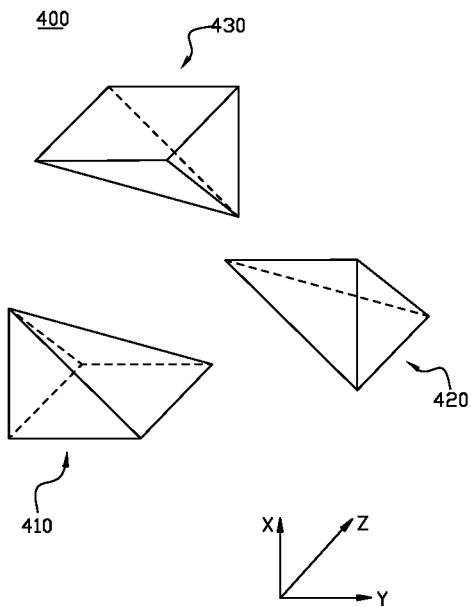
Figure 7C:
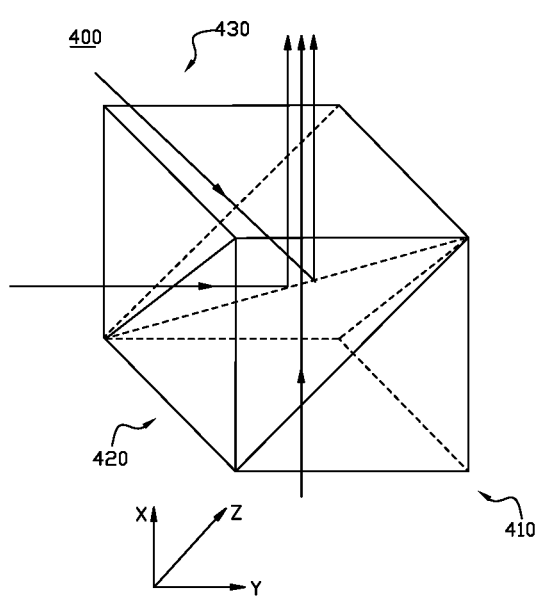

FIGS. 7A, 7B and 7C are respectively a schematic diagram, an exploded diagram and a light path diagram of a BSC device in accordance with the fourth embodiment of the invention. As shown in FIG. 7A-7C, the fourth embodiment is a modification of the third embodiment. In the fourth embodiment, the BSC device 400 includes a first prism 410, a second prism 420 and a third prism 430. The BSC device 400 of the fourth embodiment and the BSC device 300 of the third embodiment are structurally symmetrical with respect to the first direction X. Therefore, description of the parts of the fourth embodiment same as or similar to that of the third embodiment is omitted.

Figure 8A:
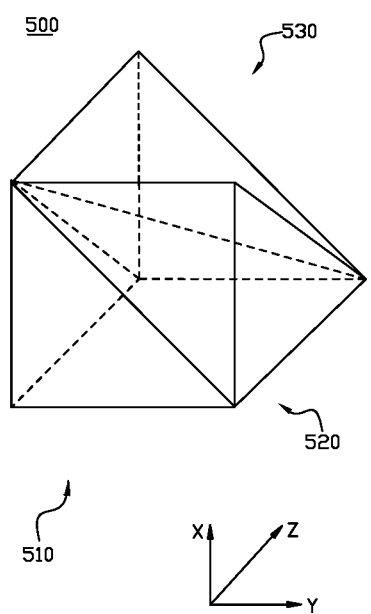
FIG. 8A is a schematic diagram of a BSC device in accordance with the fifth embodiment of the invention.
Figure 8B:
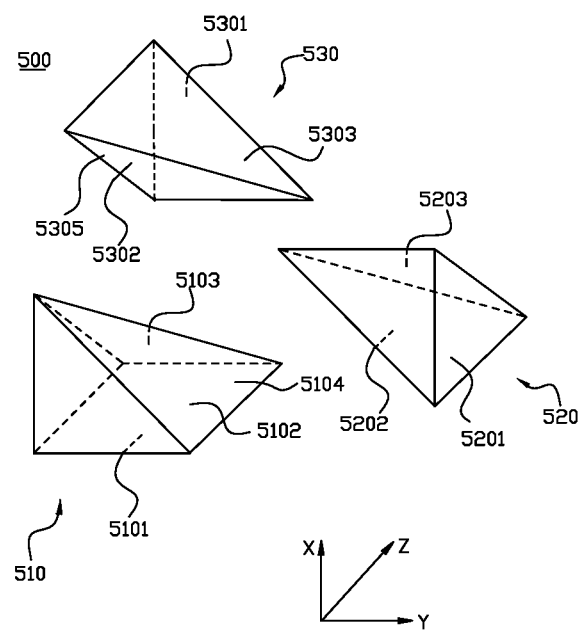
FIG. 8B is an exploded diagram of the BSC device in accordance with the fifth embodiment of the invention.
Figure 8C:
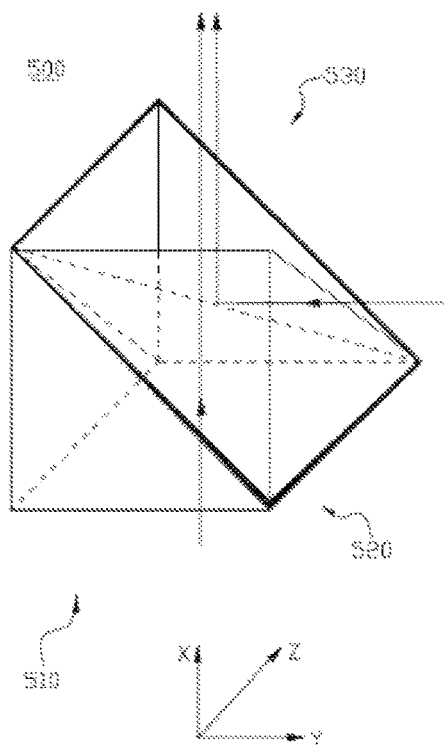
FIG. 8C depicts the light paths of the beams in the first and second ranges of wavelengths for the BSC device in accordance with the fifth embodiment of the invention.
Figure 8D:
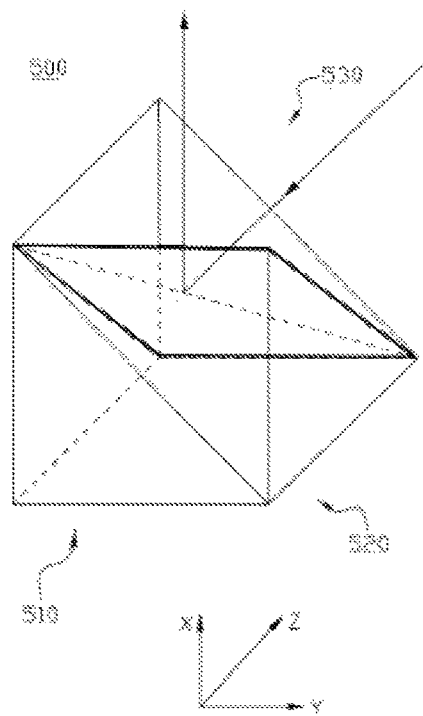
FIG. 8D depicts the light path of the beam in the third range of wavelengths for the BSC device in accordance with the fifth embodiment of the invention.
Figure 8E:
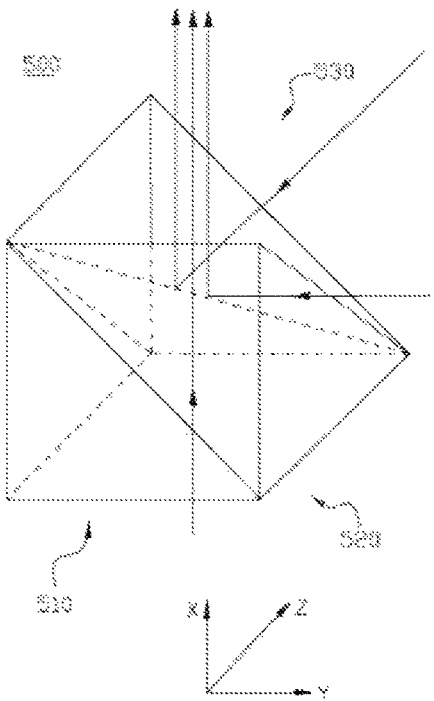
FIG. 8E depicts the light paths for the BSC device in accordance with the fifth embodiment of the invention.

FIGS. 8A and 8B are respectively a schematic diagram and an exploded diagram of a BSC device in accordance with the fifth embodiment of the invention, FIG. 8C depicts the light paths of the beams in the first and second ranges of wavelengths for the BSC device in accordance with the fifth embodiment of the invention, FIG. 8D depicts the light path of the beam in the third range of wavelengths for the BSC device in accordance with the fifth embodiment of the invention, and FIG. 8E depicts the light paths for the BSC device in accordance with the fifth embodiment of the invention. The fifth embodiment is a modification of the first embodiment. Therefore, description of the parts of the fifth embodiment same as that of the first embodiment is omitted. As shown in FIGS. 8A-8E, in the fifth embodiment, the BSC device 500 includes a first prism 510, a second prism 520 and a third prism 530. The first prism 510 includes a first surface 5101 allowing a beam in a first range of wavelengths to pass through, a second surface 5102 allowing the beam in the first range of wavelengths to pass through and reflecting a beam in a second range of wavelengths, and a third surface 5103 allowing the beam in the first range of wavelengths to pass through and reflecting a beam in a third range of wavelengths. The second surface 5102 and the third surface 5103 are adjacent to each other. When observed in the first direction X, the second surface 5102 and the third surface 5103 are shaded from view by the first surface 5101.

The second prism 520 includes a fourth surface 5201 allowing the beam in the second range of wavelengths to pass through, a fifth surfaced 5202 contacting the second surface 5102, allowing the beam in the first range of wavelengths to pass through and reflecting the beam in the second range of wavelengths, and a sixth surface 5203 allowing the beams in the first and second ranges of wavelengths to pass through and reflecting the beam in the third range of wavelengths. The fourth, fifth and sixth surfaces 5201, 5202 and 5203 are adjacent to each other.

The third prism 530 includes a seventh surface 5301 allowing the beam in the third range of wavelengths to pass through, an eighth surface 5302 contacting the third surface 5103, allowing the beam in the first range of wavelengths to pass through and reflecting the beam in the third range of wavelengths, a ninth surface 5303 allowing the beams in the first and third ranges of wavelengths to pass through and reflecting the beam in the second range of wavelengths.

The second surface 5102 and the fifth surface 5202 can be connected by gluing. A first optical film 5104 is provided between the second surface 5102 and the fifth surface 5202 by coating. The first optical film 5104 may be coated on the second surface 5102 or the fifth surface 5202. The first optical film 5104 allows the beam in the first range of wavelengths to pass through and reflects the beam in the second range of wavelengths. The sixth surface 5203 allows the beams in the first and second ranges of wavelengths to pass through and reflecting the beam in the third range of wavelengths. To achieve this purpose, the sixth surface 5203 may be coated with an optical film.

The third surface 5103 and the eighth surface 5302 can be connected by gluing. A second optical film 5305 is provided between the third surface 5103 and the eighth surface 5302. The second optical film 5305 may be coated on the third surface 5103 or on the eighth surface 5302, to reflect the beam in the third range of wavelengths thereon. The second optical film 5305 allows the beam in the first range of wavelengths to pass through and reflects the beam in the third range of wavelengths.

The ninth surface 5303 and the fifth surface 5202 may be disposed in parallel or be coplanar. The sixth surface 5203 and the third surface 5103 may be disposed in parallel or be coplanar. In FIG. 8C, the ninth surface 5303 and the fifth surface 5202 (or the second surface 5102) are represented by bold lines, both of which are the reflective surfaces reflecting the beam in the second range of wavelengths and are parallel to the third direction Z. In FIG. 8D, the sixth surface 5203 and the third surface 5103 (or the eighth surface 5302) are represented by bold lines, both of which are reflective surfaces reflecting the beam in the third range of wavelengths and are parallel to the second direction Y.

As shown, a part of the beam in the first range of wavelengths which is incident in the first direction X sequentially passes through the first surface 5101, the second surface 5102, the first optical film 5104 and the fifth surface 5202, and is emitted from the sixth surface 5203 in the first direction X. Another part of the beam in the first range of wavelengths which is incident in the first direction X passes through the third surface 5103, the second optical film 5305 and the eighth surface 5302 and is emitted from the ninth surface 5303 in the first direction X.

The beam in the second range of wavelengths is incident in the second direction Y. A part of the beam in the second range of wavelengths passes through the fourth surface 5201, is reflected on the first optical film 5104 provided between the second surface 5102 and the fifth surface 5202, passes through the sixth surface 5203, and is emitted in the first direction X. Another part of the beam in the second range of wavelengths is reflected on the ninth surface 5303 and is emitted in the first direction X.

The beam in the third range of wavelengths is incident in the third direction Z. A part of the beam in the third range of wavelengths passes through the seventh surface 5301, reaches the eighth surface 5302, is reflected on the second optical film 5305 to the ninth surface 5303, and is emitted from the ninth surface 5303 in the first direction X. Another part of the beam in the third range of wavelengths is reflected on the sixth surface 5203 and is emitted in the first direction X. Accordingly, combination of the beams in the first, second and third ranges of wavelengths are performed.

Reversed propagation of the beams is described as follows: A part of the combined beam reaches the ninth surface 5303. The beam in the first range of wavelengths sequentially passes through the ninth surface 5303, the eighth surface 5302, the second optical film 5305 and the third surface 5103, and is emitted from the first surface 5101. The beam in the second range of wavelengths is reflected on the ninth surface 5303 and is emitted in the second direction Y. The beam in the third range of wavelengths passes through the ninth surface 5303 and the eighth surface 5302, is reflected on the second optical film 5305, and is emitted from the seventh surface 5301 from the seventh surface 530. Accordingly, splitting the combined beam into the beams in the first, second and third ranges of wavelengths is performed. Another part of the combined beam reaches the sixth surface 5203. The beam in the first range of wavelengths sequentially passes through the sixth surface 5203, the fifth surface 5202, the first optical film 5104, the second surface 5102 and the first surface 5101 and is emitted in the first direction X. The beam in the second range of wavelengths passes through the sixth surface 5203 and the fifth surface 5202, is reflected on the first optical film 5104, and is emitted from the fourth surface 5201 in the second direction Y. The beam in the third range of wavelengths is reflected on the sixth surface 5203 and is emitted in the third direction Z. However, the invention is not limited thereto. The light paths of the fifth embodiment may be modified to be the same as those of the first embodiment or may be arranged without passing through the second prism 520.

In the fifth embodiment shown in FIGS. 8A-8C, the first prism 510 is a square pyramidal prism and the first surface 5101 is the bottom surface of the first prism 510. The second prism 520 is a triangular pyramidal prism. The third prism 530 is a triangular pyramidal prism. The first direction X, the second direction Y and the third direction Z are perpendicular to each other. The first surface 5101 and the second surface 5102 have an included angle of 45 degrees therebetween. The first surface 5101 and the third surface 5103 also have an included angle of 45 degrees therebetween. The fourth surface 5201 is perpendicular to the first surface 5101. The sixth surface 5203 and the first surface 5101 have an included angle of 45 degrees therebetween. The seventh surface 5301 is perpendicular to the first surface 5101 and the fourth surface 5201. The eighth surface 5302 and the seventh surface 5301 have an included angle of 45 degrees therebetween.

However, the invention is not limited to the above embodiment. The angles between the surfaces may be changed and the incident direction of the beam may be changed, to perform the operation of splitting and combining the beams in the first, second and third ranges of wavelengths. In addition, the forms of the first prism 510, the second prism 520 and the third prism 530 may be changed.

Figure 9A:
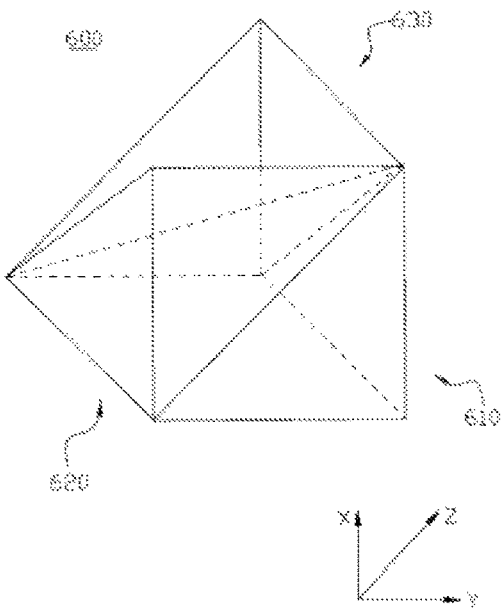
FIGS. 9A, 9B and 9C are respectively a schematic diagram, an exploded diagram and a light path diagram of a BSC device in accordance with the sixth embodiment of the invention.
Figure 9B:
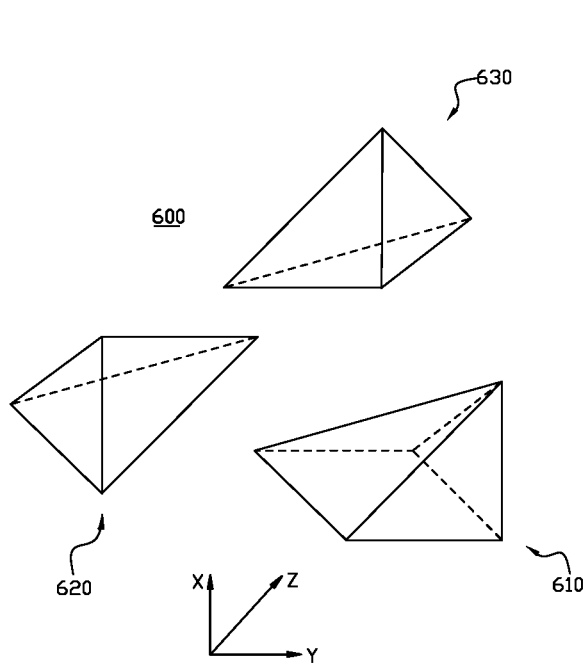
Figure 9C:
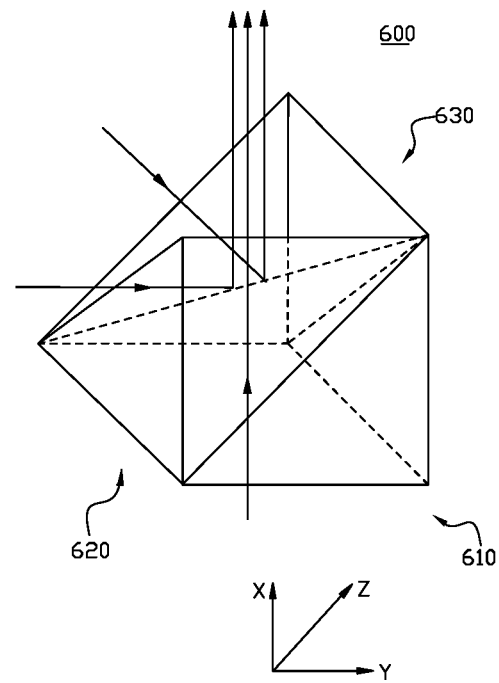

FIGS. 9A, 9B and 9C are respectively a schematic diagram, an exploded diagram and a light path diagram of a BSC device in accordance with the sixth embodiment of the invention. As shown in FIG. 9A-9C, the sixth embodiment is a modification of the fifth embodiment. In the sixth embodiment, the BSC device 600 includes a first prism 610, a second prism 620 and a third prism 630. The BSC device 600 of the sixth embodiment and the BSC device 500 of the fifth embodiment are structurally symmetrical with respect to the first direction X. Therefore, description of the part of the sixth embodiment same as or similar to that of the fifth embodiment is omitted.

Figure 10A:
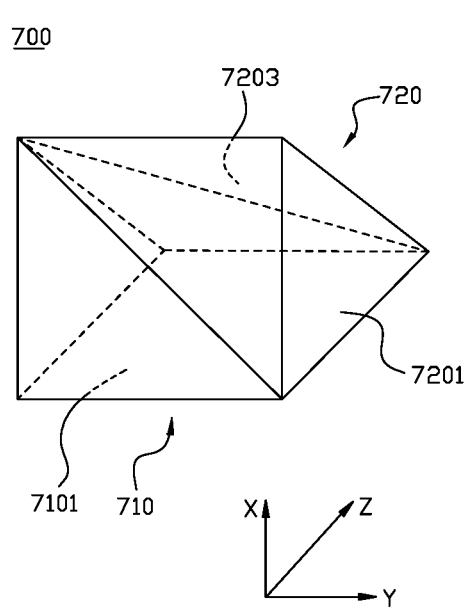
FIGS. 10A, 10B and 10C are respectively a schematic diagram, an exploded diagram and a light path diagram of a BSC device in accordance with the seventh embodiment of the invention.
Figure 10B:
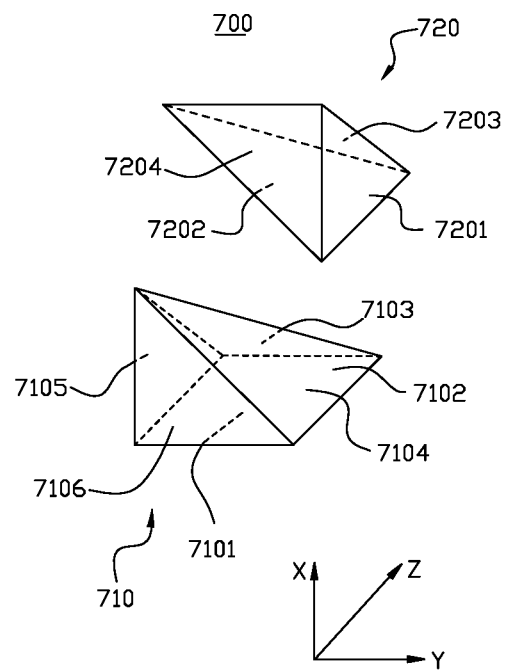
Figure 10C:
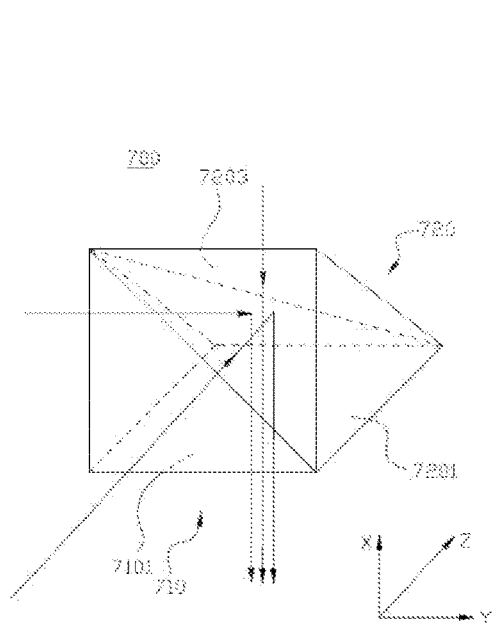

FIGS. 10A, 10B and 10C are respectively a schematic diagram, an exploded diagram and a light path diagram of a BSC device in accordance with the seventh embodiment of the invention. The seventh embodiment is a modification of the first embodiment. Therefore, description of the parts of the seventh embodiment same as that of the first embodiment is omitted. The BSC device 700 of the seventh embodiment, having the same structure as that of the first embodiment, includes a first prism 710 and a second prism 720 connected to each other. The first prism 710 includes a first surface 7101 allowing beams in first, second and third ranges of wavelengths to pass through, a second surface 7102 allowing the beam in the first range of wavelengths to pass through and reflecting the beam in the second range of wavelengths, a third surface 7103 allowing the beam in the first range of wavelengths to pass through and reflecting the beam in the third range of wavelengths, a seventh surface 7105 allowing the beam in the second range of wavelengths to pass through, and an eighth surface 7106 allowing the beam in the third range of wavelengths to pass through. The second surface 7102 and the third surface 7103 are adjacent to each other. When observed in the first direction X, the second surface 7102 and the third surface 7103 are shaded from view by the first surface 7101. The second prism 720 includes a fourth surface 7201, a fifth surfaced 7202 contacting the second surface 7102, allowing the beam in the first range of wavelengths to pass through and reflecting the beam in the second range of wavelengths, a sixth surface 7203 allowing the beam in the first range of wavelengths to pass through and reflecting the beam in the third range of wavelengths, and a ninth surface 7204 allowing the beam in the third range of wavelengths to pass through. The fourth, fifth and sixth surfaces 7201, 7202 and 7203 are adjacent to each other.

The second surface 7102 and the fifth surface 7202 can be connected by gluing. A first optical film 7104 is provided between the second surface 7102 and the fifth surface 7202 by coating. The first optical film 7104 may be coated on the second surface 7102 or the fifth surface 7202. The first optical film 7104 allows the beam in the first range of wavelengths to pass through and reflects the beam in the second range of wavelengths. The sixth surface 7203 allows the beams in the first and second ranges of wavelengths to pass through and reflects the beam in the third range of wavelengths. To achieve the purpose, the sixth surface 7203 may be coated with an optical film.

The third surface 7103 and the sixth surface 7203 may be disposed in parallel or be coplanar. Further, the third surface 7103 and the sixth surface 7203 are parallel to the direction in which the beam in the second range of wavelengths passes through the seventh surface 7105. The third surface 7103 allows the beam in the first range of wavelengths to pass through and reflects the beam in the third range of wavelengths. To achieve this purpose, the third surface 7103 may be coated with an optical film.

In the seventh embodiment, the propagation of the beams in the first, second and third ranges of wavelengths and the incident direction and the emitting direction of the combined beam are reverse to those in the first embodiment.

The beam in the first range of wavelengths which is incident in the first direction X sequentially passes through the sixth surface 7203, the fifth surface 7202, the first optical film 7104 and the second surface 7102, and is emitted from the first surface 7101 in the first direction X. The beam in the second range of wavelengths which is incident in the second direction Y passes through the seventh surface 7105, is reflected on the first optical film 7104 provided between the second surface 7102 and the fifth surface 7202, and is emitted from the first surface 7101 in the first direction X. The beam in the third range of wavelengths which is incident in the third direction Z passes through the ninth surface 7204, reaches the sixth surface 7203, is reflected on the sixth surface 7203, passes through the fifth surface 7202, the first optical film 7104 and the second surface 7102, and is emitted from the first surface 7101 in the first direction X.

The above-mentioned propagation of the beams can be reversed: A combined beam is incident in the first direction X. A beam in the first range of wavelengths sequentially passes through the first surface 7101, the second surface 7102, the first optical film 7104 and the fifth surface 7202, and is emitted from the sixth surface 7203 in the first direction X. A beam in the second range of wavelengths passes through the first surface 7101, is reflected on the first optical film 7104 provided between the second surface 7102 and the fifth surface 7202, and is emitted from the seventh surface 7105 in the second direction Y. A beam in the third range of wavelengths passes through the first surface 7101, the second surface 7102, the first optical film 7104 and the fifth surface 7202, is reflected on the sixth surface 7203, and is emitted from the ninth surface 7204 in the third direction Z.

When the area onto which the beam is incident is relatively large or the size of the BSC device is relatively small, the incident beams may simultaneously reaches plurality surfaces. Under such circumstance, the beam in the first range of wavelengths is incident in the first direction. A part of the beam in the first range of wavelengths sequentially passes through the sixth surface 7203, the fifth surface 7202, the first optical film 7104 and the second surface 7102, and is emitted from the first surface 7101 in the first direction X. Another part of the beam in the first range of wavelengths which is incident in the first direction X passes through the third surface 7103 and is emitted from the first surface 7101 in the first direction X. The beam in the second range of wavelengths which is incident in the second direction Y passes through the seventh surface 7105, is reflected on the first optical film 7104 provided between the second surface 7102 and the fifth surface 7202, and is emitted from the first surface 7101 in the first direction X. A part of the beam in the third range of wavelengths which is incident in the third direction Z passes through the eighth surface 7106, reaches the third surface 7103, is reflected on the third surface 7103, and is emitted from the first surface 7101 in the first direction X. Another part of the beam in the third range of wavelengths which is incident in the third direction Z passes through the ninth surface 7204, reaches the sixth surface 7203, is reflected on the sixth surface 7203, passes through the fifth surface 7202, the first optical film 7104 and the second surface 7102, and is emitted from the first surface 7101 in the first direction X.

The reverse propagation of the beams is described as follows: A combined beam is incident on the first surface 7101 in the first direction X. A part of the beam in the first range of wavelengths sequentially passes through the first surface 7101, the second surface 7102, the first optical film 7104 and the fifth surface 7202, and is emitted from the sixth surface 7203 in the first direction X. Another part of the beam in the first range of wavelengths passes through the first surface 7101 and is emitted from the third surface 7103 in the first direction X. The beam in the second range of wavelengths passes through the first surface 7101, is reflected on the first optical film 7104 provided between the second surface 7102 and the fifth surface 7202, and is emitted from the seventh surface 7105 in the second direction Y. A part of the beam in the third range of wavelengths passes through the first surface 7101, is reflected on the third surface 7103, and is emitted on the eighth surface 7106 in the third direction Z. Another part of the beam in the third range of wavelengths passes through the first surface 7101, the second surface 7102, the first optical film 7104 and the fifth surface 7202, is reflected on the sixth surface 7203, and is emitted from the ninth surface 7204 in the third direction Z.

In the seventh embodiment, the first prism 710 is a square pyramidal prism and the first surface 7101 is the bottom surface of the first prism 710. The second prism 720 is a triangular pyramidal prism.

Figure 11A:
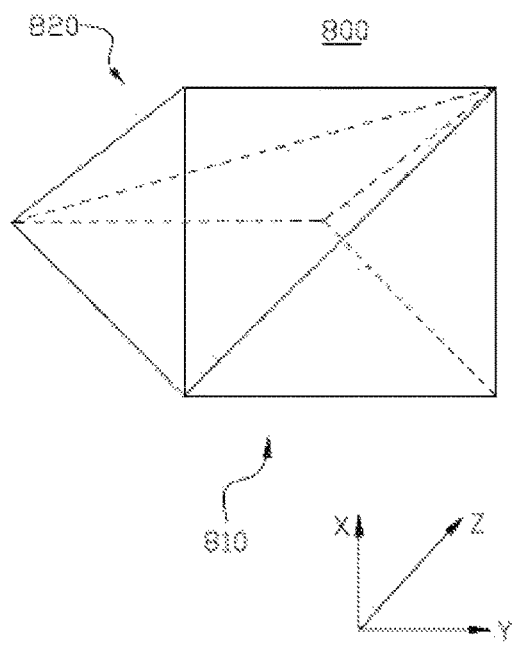
FIGS. 11A, 11B and 11C are respectively a schematic diagram, an exploded diagram and a light path diagram of a BSC device in accordance with the eighth embodiment of the invention.
Figure 11B:
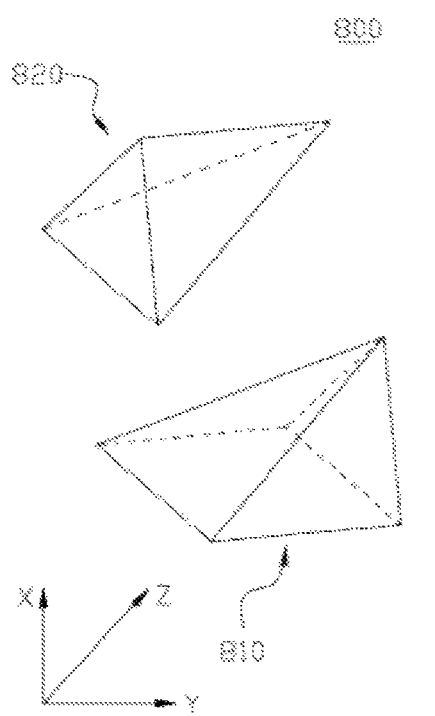
Figure 11C:
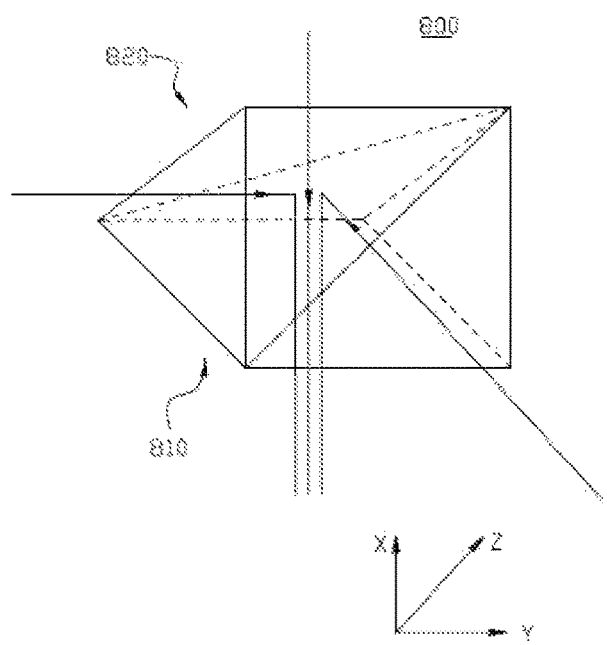

FIGS. 11A, 11B and 11C are respectively a schematic diagram, an exploded diagram and a light path diagram of a BSC device in accordance with the eighth embodiment of the invention. As shown in FIG. 11A-11C, the eighth embodiment is a modification of the seventh embodiment. In the eighth embodiment, the BSC device 800 includes a first prism 810 and a second prism 820. The BSC device 800 of the eighth embodiment and the BSC device 700 of the seventh embodiment are structurally symmetrical with respect to the first direction X. Therefore, description of the part of the eighth embodiment same as or similar to that of the seventh embodiment is omitted.

Figure 12A:
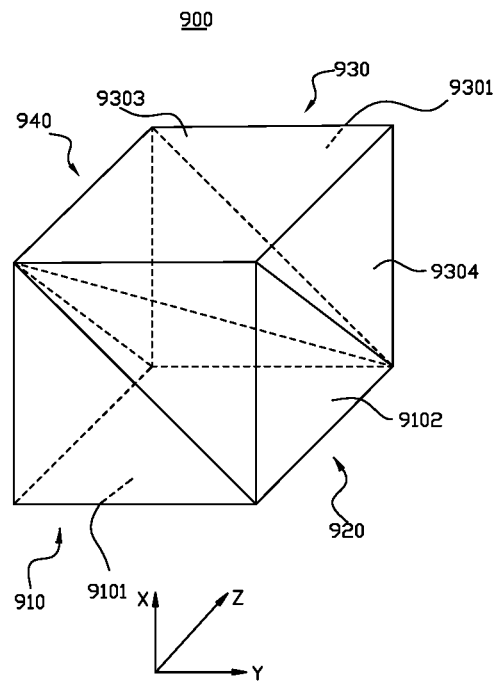
FIG. 12A is a schematic diagram of a BSC device in accordance with the ninth embodiment of the invention.
Figure 12B:
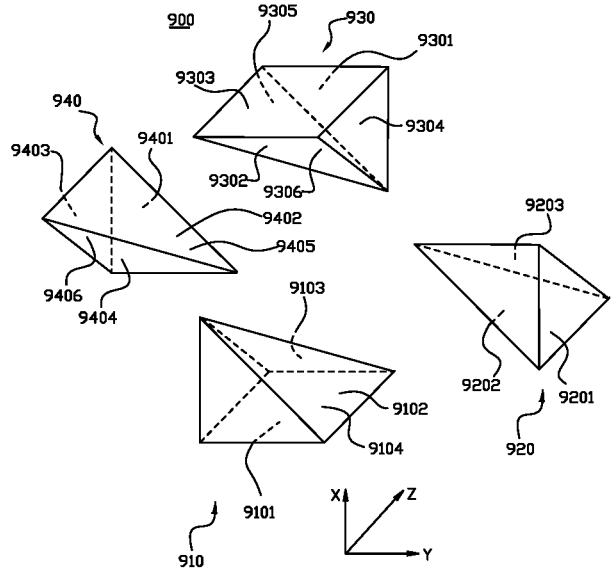
FIG. 12B is an exploded diagram of the BSC device in accordance with the ninth embodiment of the invention.
Figure 12C:
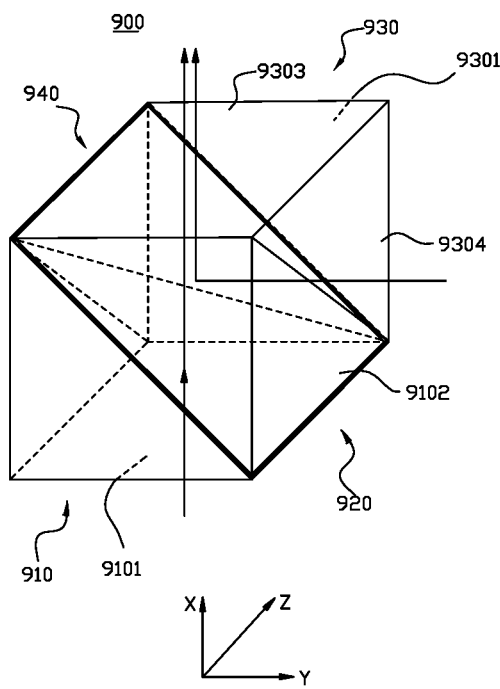
FIG. 12C depicts the light paths of the beams in the first and second ranges of wavelengths for the BSC device in accordance with the ninth embodiment of the invention.
Figure 12D:
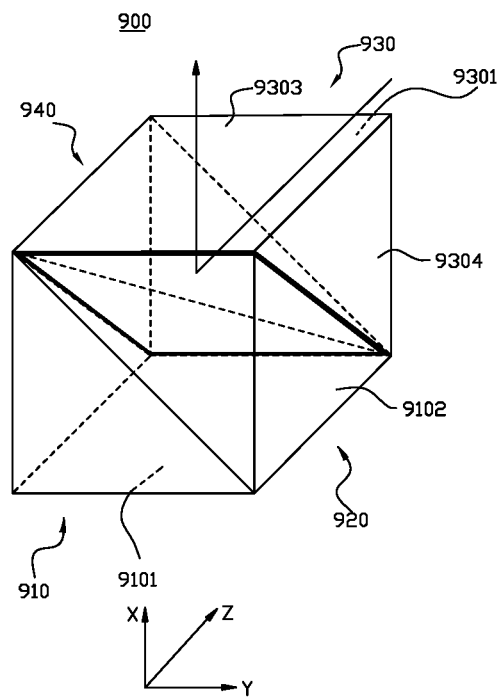
FIG. 12D depicts the light path of the beam in the third range of wavelengths for the BSC device in accordance with the ninth embodiment of the invention.
Figure 12E:
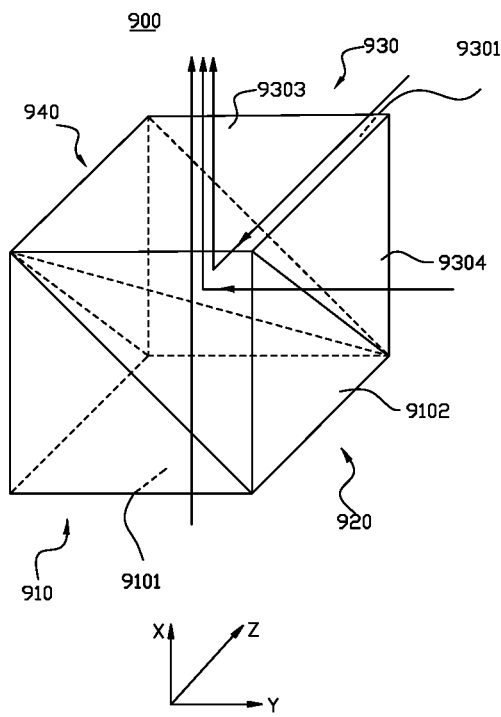
FIG. 12E depicts the light paths for the BSC device in accordance with the ninth embodiment of the invention.

FIGS. 12A and 12B are respectively a schematic diagram and an exploded diagram of a BSC device in accordance with the ninth embodiment of the invention, FIG. 12C depicts the light paths of the beams in the first and second ranges of wavelengths for the BSC device in accordance with the ninth embodiment of the invention, FIG. 12D depicts the light path of the beam in the third range of wavelengths for the BSC device in accordance with the ninth embodiment of the invention, and FIG. 12E depicts the light paths for the BSC device in accordance with the ninth embodiment of the invention. The ninth embodiment is a modification of the fourth and fifth embodiments. Therefore, description of the parts of the ninth embodiment same as or similar to that of the fifth embodiment is omitted. As shown in FIGS. 12A-12C, in the ninth embodiment, the BSC device 900 includes a first prism 910, a second prism 920, a third prism 930 and a fourth prism 940. The first prism 910 includes a first surface 9101 allowing a beam in a first range of wavelengths to pass through, a second surface 9102 allowing the beam in the first range of wavelengths to pass through, and a third surface 9103 being adjacent to the second surface 9102, allowing the beam in the first range of wavelengths to pass through and reflecting a beam in a third range of wavelengths. When observed in a direction perpendicular to the first surface 9101 (i.e. the first direction X), the second surface 9102 and the third surface 9103 are shaded from view by the first surface 9101.

The second prism 920 includes a fourth surface 9201 allowing the beam in the second range of wavelengths to pass through, a fifth surfaced 9202 contacting the second surface 9102, allowing the beam in the first range of wavelengths to pass through and reflecting the beam in the second range of wavelengths, and a sixth surface 9203 allowing the beams in the first and second ranges of wavelengths to pass through and reflecting the beam in the third range of wavelengths. The fourth, fifth and sixth surfaces 9201, 9202 and 9203 are adjacent to each other.

The third prism 930 is a square pyramidal prism and includes a seventh surface 9301 allowing the beam in the third range of wavelengths to pass through, an eighth surface 9302 contacting the sixth surface 9203, opposing the seventh surface 9301, allowing the beams in the first and second ranges of wavelengths to pass through and reflecting the beam in the third range of wavelengths, a ninth surface 9303 being the bottom surface of the third prism 930 and allowing the beams in the first, second and third ranges of wavelengths to pass through, a tenth surface 9304 allowing the beam in the second range of wavelengths to pass through, and an eleventh surface 9305 allowing the beams in the first and third ranges of wavelengths to pass through and reflecting the beam in the second range of wavelengths. When observed in the first direction X, the seventh surface 9301, the eighth surface 9302, the tenth surface 9304 and the eleventh 9305 are shaded from view by the ninth surface 9303.

The fourth prism 940 includes a twelfth surface 9401 allowing the beam in the third range of wavelengths to pass through, a thirteenth surface 9402 contacting the eleventh surface 9305, allowing the beams in the first and third ranges of wavelengths to pass through and reflecting the beam in the second range of wavelengths, a fourteenth surface 9403 allowing the beam in the first range of wavelengths to pass through and reflecting the beam in the second range of wavelengths, and a fifteenth surface 9404 contacting the third surface 9103, allowing the beam in the first range of wavelengths to pass through and reflecting the beam in the third range of wavelengths.

The second surface 9102 and the fifth surface 9202 can be connected by gluing. A first optical film 9104 is provided between the second surface 9102 and the fifth surface 9202 by coating. The first optical film 9104 may be coated on the second surface 9102 or the fifth surface 9202. The first optical film 9104 allows the beam in the first range of wavelengths to pass through and reflects the beam in the second range of wavelengths.

The sixth surface 9203 and the eighth surface 9302 can be connected by gluing. A second optical film 9306 is provided between the sixth surface 9203 and the eighth surface 9302. The second optical film 9306 may coated on the sixth surface 9203 or on the eighth surface 9302. The second optical film 9306 allows the beam in the first range of wavelengths to pass through and reflects the beam in the third range of wavelengths.

The thirteenth surface 9402 and the eleventh surface 9305 can be connected by gluing. A third optical film 9405 is provided between the thirteenth surface 9402 and the eleventh surface 9305. The third optical film 9405 may coated on the thirteenth surface 9402 or on the eleventh surface 9305, to perform reflection of the second range of wavelengths thereon. The third optical film 9405 allows the beam in the first range of wavelengths to pass through and reflects the beam in the second range of wavelengths.

The fifteenth surface 9404 and the third surface 9103 can be connected by gluing. A fourth optical film 9406 is provided between the fifteenth surface 9404 and the third surface 9103. The fourth optical film 9406 may be coated on the fifteenth surface 9404 or on the third surface 9103 to perform reflection of the beam in the third range of wavelengths thereon. The fourth optical film 9406 allows the beam in the first range of wavelengths to pass through and reflects the beam in the third range of wavelengths.

The fourth surface 9201 and the tenth surface 9304 may be disposed in parallel or be coplanar. The eleventh surface 9305 and the fifth surface 9202 may be disposed in parallel or be coplanar. The sixth surface 9203 and the third surface 9103 may be disposed in parallel or be coplanar. Further, the sixth surface 9203 and the third surface 9103 are parallel to the direction in which the beam in the second range of wavelengths passes through the fourth surface 9201. In FIG. 12C, the eleventh surface 9305 (or the thirteenth surface 9402) and the fifth surface 9202 (or the second surface 9102) are represented by bold lines, both of which are the reflective surfaces reflecting the beam in the second range of wavelengths and are parallel to the third direction Z. In FIG. 12D, the sixth surface 9203 (or the eighth surface 9302) and the third surface 9103 (or the fifteenth surface 9404) are represented by bold lines, both of which are reflective surfaces reflecting the beam in the third range of wavelengths and are parallel to the second direction Y.

The light paths in the ninth embodiment are described as follows: The beam in the first range of wavelengths which is incident in the first direction X sequentially passes through the first surface 9101, the second surface 9102, the first optical film 9104, the fifth surface 9202, the sixth surface 9203, the second optical film 9306 and the eighth surface 9302, and is emitted from the ninth surface 9303. The beam in the second range of wavelengths which is incident in the second direction Y passes through the fourth surface 9201, is reflected on the first optical film 9104 provided between the second surface 9102 and the fifth surface 9202, passes through the sixth surface 9203, the second optical film 9306 and the eighth surface 9302, and is emitted from the ninth surface 9303 in the first direction X. The beam in the third range of wavelengths which is incident in the third direction Z passes through the seventh surface 9301, reaches the eighth surface 9302, is reflected on the second optical film 9306, and is emitted from the ninth surface 9303 in the first direction X.

The above-mentioned propagation of the beams can be reversed: A combined beam is incident on the ninth surface 9303 in the first direction X. The beam in the first range of wavelengths sequentially passes through the eighth surface 9302, the second optical film 9306, the sixth surface 9203, the fifth surface 9202, the first optical film 9104 and the second surface 9102, and is emitted from the first surface 9101 in the first direction X. The beam in the second range of wavelengths sequentially is incident on the ninth surface 9303, sequentially passes through the eighth surface 9302, the second optical film 9306 and the sixth surface 9203, is reflected on the first optical film 9104 provided between the second surface 9102 and the fifth surface 9202, and is emitted from the fourth surface 9201 in the second direction Y. The beam in the third range of wavelengths is incident on the ninth surface 9303, is reflected on the second optical film 9306 provided between the eighth surface 9302 and the sixth surface 9203, and is emitted from the sixth surface 9203 in the third direction Z. Accordingly, the combined beam is split into the beams in the first, second and third ranges of wavelengths.

When the area onto which the beam is incident is relatively large or the size of the BSC device is relatively small, the beams in the first and third ranges of wavelengths may simultaneously reaches plurality surfaces. Under such circumstance, the beam in the first range of wavelengths is incident on the first surface 9101 in the first direction X. A part of the beam in the first range of wavelengths sequentially passes through the first surface 9101, the second surface 9102, the first optical film 9104, the fifth surface 9202, the sixth surface 9203, the second optical film 9306 and the eighth surface 9302, and is emitted from the ninth surface 9303. Another part of the beam in the first range of wavelengths sequentially passes through the third surface 9103, the fourth optical film 9406, the fifteenth surface 9404, the thirteenth surface 9402, the third optical film 9405 and the eleventh surface 9305 and is emitted from the ninth surface 9303.

The beam in the second range of wavelengths is incident in the second direction Y. A part of the beam in the second range of wavelengths passes through the fourth surface 9201, is reflected on the first optical film 9104 provided between the second surface 9102 and the fifth surface 9202, passes through the sixth surface 9203, the second optical film 9306 and the eighth surface 9302, and is emitted from the ninth surface 9303 in the first direction X. Another part of the beam in the second range of wavelengths which is incident in the second direction Y passes through the tenth surface 9304, is reflected on the third optical film 9405 provided between the thirteenth surface 9402 and the eleventh surface 9305, and is emitted from the ninth surface 9303 in the first direction X. In FIG. 12C, the bold lines represent the reflective surfaces reflecting the beam in the second range of wavelengths.

The beam in the third range of wavelengths is incident in the third direction Z. A part of the beam in the third range of wavelengths passes through the seventh surface 9301, reaches the eighth surface 9302, is reflected on the second optical film 9306 to the ninth surface 9303 and is emitted from the ninth surface 9303 in the first direction X. Another part of the beam in the third range of wavelengths passes through the twelfth surface 9401, reaches the fifteenth surface 9404, is reflected on the fourth optical film 9406 provided between the fifteenth surface 9404 and the third surface 9103, passes through the eleventh surface 9305, and is emitted from the ninth surface 9303 in the first direction X. Thus, combination of the beams in the first, second and third ranges of wavelengths is performed.

The reverse propagation of the beams is described as follows: A combined beam is incident on the ninth surface 9303 in the first direction X. A part of the beam in the first range of wavelengths sequentially passes through the eleventh surface 9305, the third optical film 9405, the thirteenth surface 9402, the fifteenth surface 9404, the fourth optical film 9406, the third surface 9103, and is emitted from the first surface 9101 in the first direction X. Another part of the beam in the first range of wavelengths sequentially passes through the eighth surface 9302, the second optical film 9306, the sixth surface 9203, the fifth surface 9202, the first optical film 9104, the second surface 9102 and is emitted from the first surface 9101 in the first direction X.

A part of the beam in the second range of wavelengths is incident on the ninth surface 9303, sequentially passes through the eighth surface 9302, the second optical film 9306, the sixth surface 9203, is reflected on the first optical film 9104 provided between the second surface 9102 and the fifth surface 9202, and is emitted from the fourth surface 9201 in the second direction Y. Another part of the beam in the second range of wavelengths is incident on the ninth surface 9303, is reflected on the third optical film 9405 provided between the thirteenth surface 9402 and the eleventh surface 9305, and is emitted from the tenth surface 9304 in the second direction Y.

A part of the beam in the third range of wavelengths is incident on the ninth surface 9303, is reflected on the second optical film 9306 provided between the eighth surface 9302 and the sixth surface 9203, and is emitted from the seventh surface 9301 in the third direction Z. Another part of the beam in the third range of wavelengths is incident on the ninth surface 9303, passes through the eleventh surface 9305, reaches the fifteenth surface 9404, is reflected on the fourth optical film 9406 provided between the fifteenth surface 9404 and the third surface 9103, and is emitted from the twelfth surface 9401 in the third direction Z. Thus, splitting a combined beam into three beams in the first, second and third ranges of wavelengths is performed.

The light paths described above are only an exemplary embodiment of the invention. After incident on the ninth surface 9303 in the first direction X, the combined beam may merely reach the eleventh surface 9305 without reaching the eighth surface 9302. The paths of the spilt beams and the paths of the corresponding combined beam can be deduced by reference to the above-mentioned light paths, and therefore the description thereof is omitted.

In the ninth embodiment shown in FIGS. 12A-12E, the first direction X, the second direction Y and the third direction Z are perpendicular to each other. The first surface 9101 and the second surface 9102 have an included angle of 45 degrees therebetween. The fourth surface 9201 is perpendicular to the first surface 9101. The fifth surface 9202 and the fourth surface 9201 have an included angle of 45 degrees therebetween. The seventh surface 9301 is perpendicular to the first surface 9101 and the fourth surface 9201. The eighth surface 9302 and the seventh surface 9301 have an included angle of 45 degrees therebetween.

However, the invention is not limited to the above embodiment. The angles between the surfaces may be changed and the incident direction of the beam may be changed, to perform the operation of splitting and combining the beams in the first, second and third ranges of wavelengths.

In the ninth embodiment, the first prism 910 is a square pyramidal prism and the first surface 9101 is the bottom surface of the first prism 910. Further, except for the second surface 9102 and the third surface 9103, the other side surfaces are perpendicular to the first surface 9101. The second prism 920 is a triangular pyramidal prism. The third prism 930 is a square pyramidal prism and the ninth surface 9303 is the bottom surface of the third prism 930. The seventh surface 9301 and the tenth surface 9304 are perpendicular to each other. However, the invention is not limited thereto. The forms of the first, second, third and fourth prisms 910, 920, 930 and 940 can be changed.

Figure 13A:
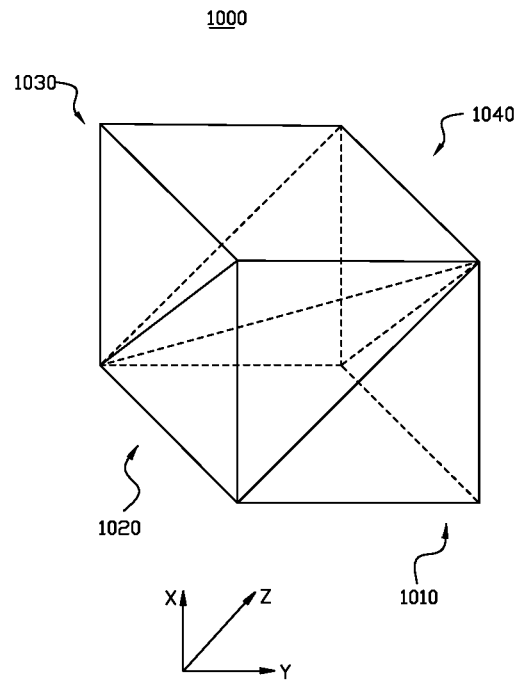
FIGS. 13A, 13B and 13C are respectively a schematic diagram, an exploded diagram and a light path diagram of a BSC device in accordance with the tenth embodiment of the invention.
Figure 13B:
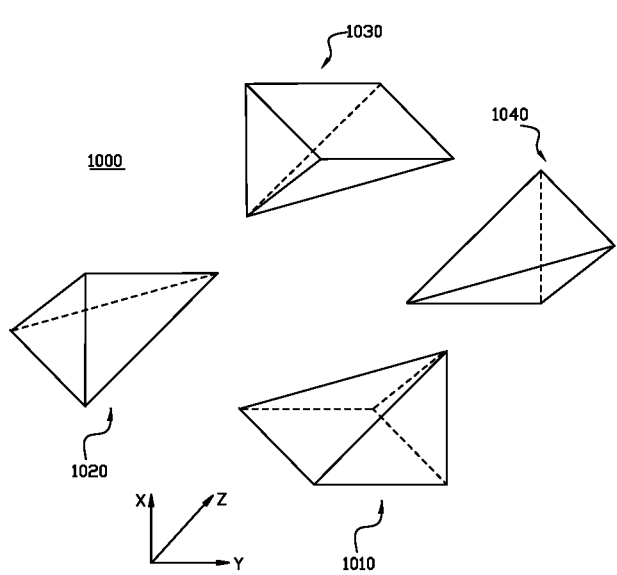
Figure 13C:
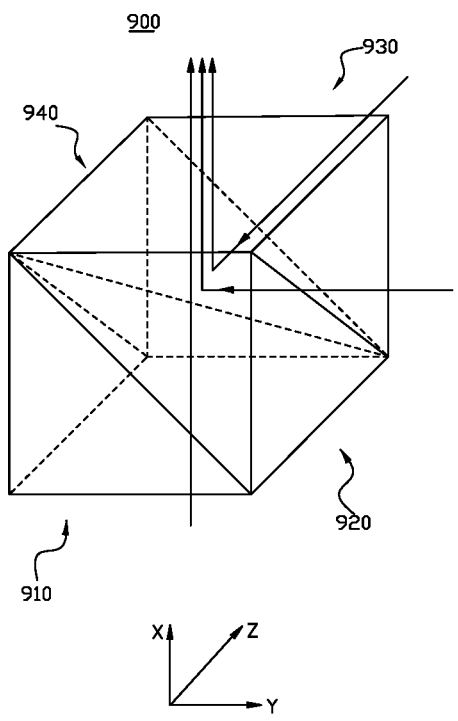

FIGS. 13A, 13B and 13C are respectively a schematic diagram, an exploded diagram and a light path diagram of a BSC device in accordance with the tenth embodiment of the invention. As shown in FIG. 13A-13C, the tenth embodiment is a modification of the ninth embodiment. In the tenth embodiment, the BSC device 1000 includes a first prism 1010, a second prism 1020, a third prism 1030 and a fourth prism 1040. The BSC 1000 of the tenth embodiment and the BSC device 900 of the ninth embodiment are structurally symmetrical with respect to the first direction X. Therefore, description of the part of the tenth embodiment same as or similar to that of the ninth embodiment is omitted.

FIGS. 14A and 14B are respectively a schematic diagram and a light path diagram of a BSC device in accordance with the eleventh embodiment of the invention. The BSC device 1000 of the eleventh embodiment includes a prism 1100 having the same structure as that of the second embodiment. The prism 1100 may be a triangular prism, including a first surface 11001 allowing the beam in the first range of wavelengths to pass through and reflecting the beam in the second range of wavelengths, a second surface 11002 allowing the beam in the second range of wavelengths to pass through, and a third surface 11003 allowing the beam in the first and second ranges of wavelengths to pass through and reflecting the beam in the third range of wavelengths.

In the eleventh embodiment as shown in FIGS. 14A and 14B, the beam in the first range of wavelengths which is incident on the first surface 11001 in the first direction X sequentially passes through the first surface 11001, and is emitted from the third surface 11003 in the first direction X. The beam in the second range of wavelengths is incident on the second surface 11002 in the second direction Y, is reflected on the first surface 11001, and is emitted from the third surface 11003 in the first direction X. The beam in the third range of wavelengths is incident on the third surface 11003 in the third direction Z, and is reflected in the first direction X.

Reversed propagation of the above beams is described as follows: A combined beam is incident on the third surface 11003 in the first direction X. A beam in the first range of wavelengths passes through the third surface 11003 and is emitted from the first surface 11001 in the first direction X. A beam in the second range of wavelengths passes through the third surface 11003, is reflected on the first surface 11001, and is emitted from the second surface 11002 in the second direction Y. A beam in the third range of wavelengths is incident on the third surface 11003 and is reflected to propagate in the third direction Z. Accordingly, only the prism 1100 is able to perform the beam splitting and combining.

In the BSC device as described above, where gaps can be formed is only at the corners of the prisms. It can be avoided that gaps are formed between prisms to affect the propagation of beams when the beams are incident on the surfaces of the prisms. The arrangement of these embodiments can effectively avoid the influence on the formed images due to arrival of the incident beam at the gaps. Further, the volume and weight of the BSC device can be reduced that benefits miniaturization of the projector, improves the quality of projection images, and increases the light energy utilization efficiency. Various embodiments are described above. However, people skilled in the art can still make modifications. For example, the structure of the BSC device 700 of the seventh embodiment is the same as that of the first embodiment. However, the propagation of the beams in the first, second and third ranges of wavelengths of the seventh embodiment is reverse to that of the first embodiment. It is understood that other embodiments can be modified in a similar way. Square pyramidal prisms are described in the above embodiments. However, the invention is not limited thereto. For example, a square pyramidal prism can be replaced with two triangular pyramidal prisms which are connected to each other. An optical film is sandwiched therebetween, allowing beams in the first, second and third ranges of wavelengths to pass through. Any embodiments can have the merits of the invention as long as the beams are incident on the surfaces of the prisms without reaching the gaps. In the embodiments described above, the arrangements of the reflective surfaces enable the beams to be combined in the BSC devices before emitted therefrom. Accordingly, the beams can be combined more efficiently and more uniformly, the light energy utilization efficiency can be increased, the quality of formed images can be improved, and the beams can be spilt more uniformly in later operation. Further, the optical film is disposed between the prisms to be protected, whereby the quality of the picture images can be stabilized and the light path and the quality of the picture images can be balanced. In the above embodiments, providing an optical film between two surfaces is described, while providing an optical film on a single surface is not particularly described. However, people skilled in the art can understand that any surface reflecting a beam in a specific range of wavelengths has an optical film coated thereon.

The invention provides an electronic device, such as a projecting related device, to include the BSC device described above. For example, a projector 1200 as shown in FIG. 15 includes a light source 1201, a projection lens 1202, a spatial light modulator (SLM) 1203, a plurality of beam splitters 1205, 1205', 1205", a plurality of relay lenses 1207, an assembly of integration lens and P-S converter 1206, and the BSC device 1204 described in the above embodiments.

In operation, light emitted from the light source 1201 sequentially passes through the beam splitter 1205", the assembly of integration lens and P-S converter 1206, the beam splitter 1205', the beam splitters 1205, the relay lenses 1207, the SLM 1203, the BSC device 1204, and the projection lens 1202 to form image on a screen. It is understood that any of the beam splitters 1205 can be replaced with a BSC devices described in the above embodiments to function the same. Also, it is understood that another BSC device (not shown) can be additionally provided between the beam splitter 1205' and the assembly of integration lens and P-S converter 1206 in the invention. Also, it is worth noting that the assembly of integration lens and P-S converter 1206 can be deemed a relay lens. Under such circumstance, the relay lenses 1207 and the assembly of integration lens and P-S converter 1206 constitute a relay lens assembly.

Figure 16:
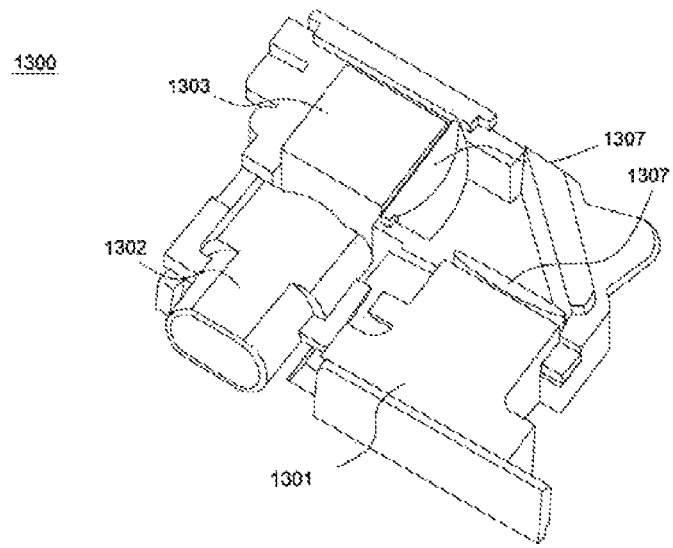
FIG. 16 is a schematic diagram of a head-mounted display including a BSC device of the invention.

The projecting related device of the invention may be a head-mounted display 1300 as shown in FIG. 16, which includes a light source 1301, a relay lens assembly 1307, a projection lens 1302, and the BSC device 1303 described above. In operation, light emitted from the light source 1301 sequentially passes through the relay lens assembly 1307, the BSC device 1303 and the projection lens 1302.

The electronic device of the invention may be a head-up display. The head-up display includes a light source, a projection lens, a reflective mirror, a spatial light modulator, a displaying element, and the BSC device described above. In operation, light emitted from the light source sequentially passes through the BSC device, the spatial light modulator, the projection lens, the reflective mirror and the displaying element, wherein the displaying element includes an imaging forming surface (like a screen).

The electronic device of the invention may be a laser range finder. The laser range finder includes an optical sensor, a light emitter and the BSC device described above.

The electronic device of the invention may be a colorimeter. The colorimeter includes an optical sensor, a digital signal processor and the BSC device described above.

The electronic device of the invention may be a panel. The panel includes a light source, a projection lens, a spatial light modulator and the BSC device described above. In operation, the light emitted from the light source sequentially passes through the BSC device, the spatial light modulator, and the projection lens.

Figure 17:
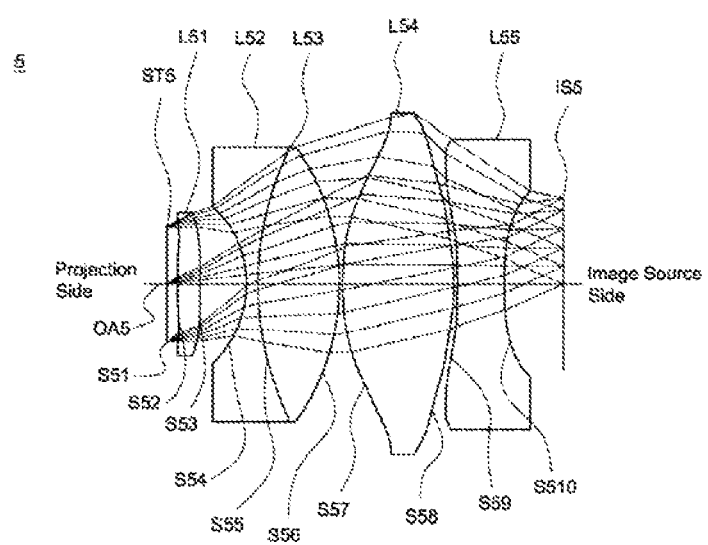
FIG. 17 depicts arrangement of the lenses and the light paths for a projection lens which is included in an electronic device of the invention.

FIG. 17 depicts arrangement of the lenses and the light paths for a projection lens or a relay lens assembly which is included in an electronic device of the invention. As shown in FIG. 17, the projection lens 5 includes a stop ST5, a first lens L51, a second lens L52, a third lens L53, a fourth lens L54 and a fifth lens L55, which are sequentially arranged along an optical axis OAS from a projection side to an image source side. In projection, light coming from the image source IS5 is projected towards the projection side. The first lens L51 is made of plastic, is with positive refractive power, and is able to converge the beam with a large angle. Further, the first lens L51 has a convex surface S53 facing the image source side and a convex surface S52 facing the projection side. The surfaces S52 and S53 are both aspheric surfaces. The second lens L52 is with negative refractive power and is made of glass. The second lens L52 has a concave surface S55 facing the image source side and a concave surface S54 facing the projection side. The surfaces S54 and S55 are both spherical surfaces. The third lens L53 is made of glass, is with positive refractive power, and is provided with the function of correcting spherical aberration and chromatic aberration. Further, the third lens L53 has a convex surface S56 facing the image source side and a convex surface S55 facing the projection side. The surface S55 is a spherical surface while the surface S56 is an aspheric surface. The fourth lens L54 is with positive refractive power and is made of glass. The second lens L58 has a convex surface S58 facing the image source side and a convex surface S57 facing the projection side. The surfaces S57 and S58 are both aspheric surfaces. The fifth lens L55 is made of plastic and is with negative refractive power. The fifth lens L55 has a concave surface S510 facing the image source side and a concave surface S59 facing the projection side. The surfaces S59 and S510 are both aspheric surfaces. The second lens L52 and the third lens L53 are cemented together without an air gap formed therebetween, to form a cemented lens which is with positive refractive power. The cemented lens functions as a relay lens for the front and rear lens groups so as to reduce the volume of the entire lenses and promote the field of view. By the design of the above lenses L51-L55, the stop ST5 and at least one of the following conditions (1)-(11) satisfied, the projection lens 5 is able to have the volume effectively reduced, F-number effectively reduced, the field of view effectively promoted, the optical aberration effectively corrected, and the chromatic aberration effectively corrected.

$$-1.2 \leq f_5/f \leq -0.9 \tag{1}$$

$$1.9 \leq f_1/f \leq 3.7 \tag{2}$$

$$-1.1 \leq f_2/f \leq -0.6 \tag{3}$$

$$0.8 \leq f_3/f \leq 1.2 \tag{4}$$

$$0.8 \leq f_4/f \leq 1.1 \tag{5}$$

$$0.3 \leq f/TTL \leq 0.45 \tag{6}$$

$$0.09 \leq BFL/TTL \leq 0.22 \tag{7}$$

$$0.5 \leq IH/f \leq 0.65 \tag{8}$$

$$-17 \leq f_{23}/f_5 \leq 30 \tag{9}$$

$$-1.15 \leq f_4/f_5 \leq -0.75 \tag{10}$$

$$-33 \leq f_{23}/f \leq 16 \tag{11}$$

where f is an effective focal length of the projection lens 5, $f_1$ is an effective focal length of the first lens L51, $f_2$ is an effective focal length of the second lens L52, $f_3$ is an effective focal length of the third lens L53, $f_4$ is an effective focal length of the fourth lens L54, $f_5$ is an effective focal length of the fifth lens L55, $f_{23}$ is an effective focal length of combination of the second lens L52 and the third lens L53, TTL is an interval from the stop ST5 to the image source IS5 along the optical axis OAS, BFL is an interval from the image source side surface 5511 to the image source IS5 along the optical axis OAS, and IH is a half image height of the projection lens 5.

The chief ray angle can be effectively reduced and the field of view can be enlarged when the condition (1): $-1.2 \leq f_5/f \leq -0.9$ is satisfied. The quality of the formed image can be effectively improved when the condition (2): $1.9 \leq f_1/f \leq 3.7$ is satisfied. The field of view can be effectively enlarged when the condition (3): $-1.1 \leq f_2/f \leq -0.6$ is satisfied. The chromatic aberration and the field curvature can be effectively corrected when the condition (4): $0.8 \leq f_3/f \leq 1.2$ is satisfied. The quality of the formed image can be effectively improved when the condition (5): $0.8 \leq f_4/f \leq 1.1$ is satisfied. The total lens length can be effectively reduced when the condition (6): $0.3 \leq f/TTL \leq 0.45$ is satisfied. The back focal length can be effectively controlled when the condition (7): $0.09 \leq BFL/TTL \leq 0.22$ is satisfied. The size of the formed image can be effectively controlled when the condition (8):

$0.5 \leq IH/f \leq 0.65$ is satisfied. The chromatic aberration and the field curvature can be effectively corrected when the condition (10): $-1.15 \leq f_4/f_5 \leq -0.75$ is satisfied.

Table 1 shows the optical specification of the projection lens 5 in FIG. 17.

TABLE 1

Effective Focal Length = 5.2 mm  F-number = 1.406
Total Lens Length = 14.943 mm  Field of View = 61.400 degrees

| Surface Number | Radius of Curvature (mm) | Thickness (mm) | Refractive Index Nd | Abbe number Vd | Effective Focal Length (mm) | Remark |
|---|---|---|---|---|---|---|
| S51 | ∞ | 0.4 | | | | Stop ST5 |
| S52 | 18.2146 | 0.845 | 1.661 | 20.412 | 18.875 | First Lens L51 |
| S53 | −41.1835 | 1.758 | | | | |
| S54 | −3.1212 | 0.400 | 1.684 | 26.671 | −4.594 | Second Lens L52 |
| S55 | 8.5649 | 3.099 | 1.883 | 40.765 | 6.117 | Third Lens L53 |
| S56 | −5.9414 | 0.100 | | | | |
| S57 | 6.2765 | 4.202 | 1.883 | 40.765 | 4.567 | Fourth Lens L54 |
| S58 | −7.9273 | 0.151 | | | | |
| S59 | −10.4971 | 1.754 | 1.661 | 20.412 | −6.014 | Fifth Lens L55 |
| S510 | 7.0283 | 2.234 | | | | |

The aspheric surface sag z of each lens in table 1 can be calculated by the following formula:

$$z = ch^2/\{1-[1-(k+1)c^2h^2]^{1/2}\} \pm Ah^4 + Bh^6 + Ch^8 + Dh^{10} + Eh^{12} \pm Fh^{14}$$

where c is curvature, h is the vertical distance from the lens surface to the optical axis, k is conic constant and A, B, C, D, E and F are aspheric coefficients.

The conic constant k and the aspheric coefficients A, B, C, D, E and F of each surface are shown in Table 2.

TABLE 2

| | k | A / E | B / F | C | D |
|---|---|---|---|---|---|
| S52 | 0.00 | 0.000 / 2.68637E−05 | −0.00357253 / −5.19113E−06 | −0.000176302 | −0.000114911 |
| S53 | 0.00 | 0.000 / 3.26231E−05 | −0.005560758 / −4.17519E−06 | −9.49865E−05 | −0.000170705 |
| S56 | 0.00 | 0.000 / 0 | 0.000169508 / 0 | 2.36741E−05 | 5.1921E−07 |
| S57 | 0.00 | 0.000 / 0 | −0.000490452 / 0 | 1.17107E−05 | −1.52217E−06 |
| S58 | 0.00 | 0.000 / 0 | 0.001376433 / 0 | −1.18118E−05 | −2.45508E−07 |
| S59 | 0.00 | 0.000 / 6.59737E−08 | −0.000439748 / 2.68869E−10 | 0.000169894 | −4.79224E−06 |
| S510 | −4.5561 | 0.000 / −4.59297E−06 | 0.001168273 / 4.00223E−07 | 9.51808E−05 | 5.09445E−05 |

Table 3 shows the parameters and condition values for conditions (1)-(11) in accordance with the embodiment of FIG. 17. It can be seen from Table 3 that the projection lens 5 of the embodiment of FIG. 17 satisfies the conditions (1)-(11).

TABLE 3

| BFL | 2.234 mm | IH | 2.780 mm | $f_{23}$ | −167.027 mm |
|---|---|---|---|---|---|
| $f_1/f$ | 3.630 | $f_2/f$ | −0.884 | $f_3/f$ | 1.176 |
| $f_4/f$ | 0.878 | $f_5/f$ | −1.156 | f/TTL | 0.348 |
| BFL/TTL | 0.150 | $f_{23}/f_5$ | 27.775 | IH/f | 0.535 |
| $f_4/f_5$ | −0.759 | $f_{23}/f$ | −32.121 | | |

Figure 18A:
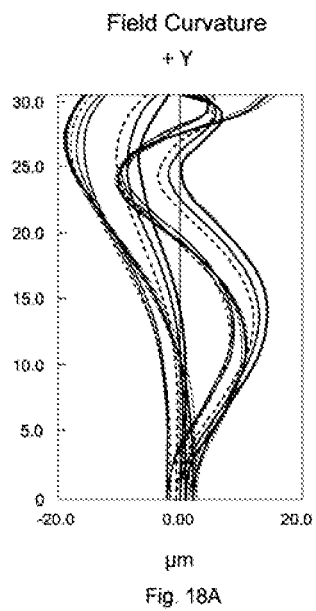
FIG. 18A depicts the field curvature of the projection lens of FIG. 17.
Figure 18B:
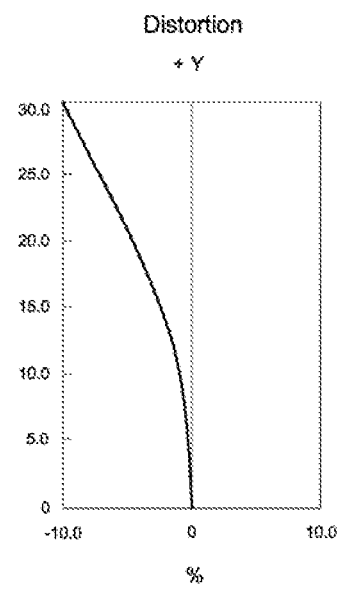
FIG. 18B depicts the distortion of the projection lens of FIG. 17.
Figure 18C:
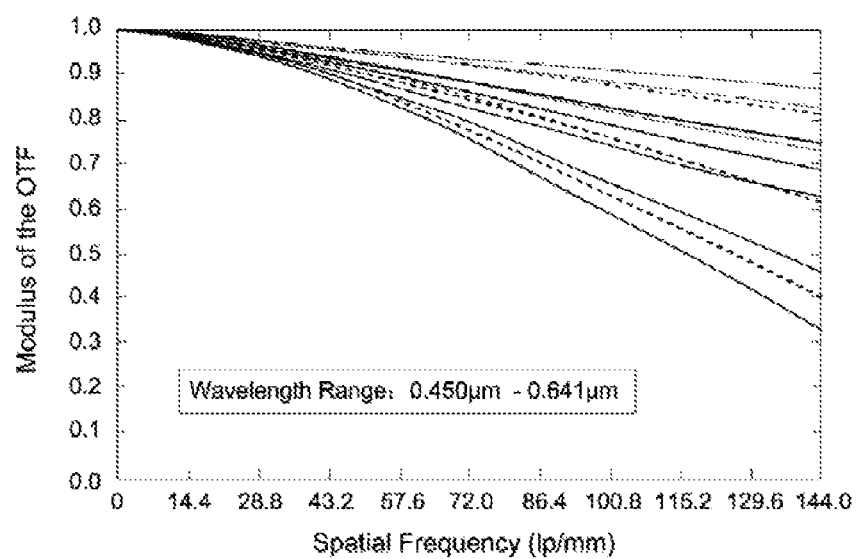
FIG. 18C depicts the modulation transfer function of the projection lens of FIG. 17.

Further, the optical performance of the projection lens 5 of FIG. 17 can meet the requirements. It can be seen from FIG. 18A that the field curvature of the projection lens 5 ranges from ~−20 μm to 16 μm. It can be seen from FIG. 18B that the distortion of the projection lens 5 ranges from ~−10% to 0%. It can be seen from FIG. 18C that the modulation transfer function of the projection lens 5 ranges from 0.32 to 1.0. It is obvious that the field curvature and the distortion of the projection lens 5 can be corrected effectively, and the resolution of the projection lens 5 can meet the requirements. Therefore, the projection lens 5 is capable of good optical performance.

In the embodiment of FIG. 17, the fourth lens L54 and the fifth lens L55 are spaced without being cemented together. That is, the fourth lens L54 and the fifth lens L55 have an air gap therebetween. However, it is understood that the fourth lens L54 and the fifth lens L55 may be cemented as a cemented lens. Such arrangement also belongs to the category of the invention.

The projection lens of FIG. 17 can be modified as follows. In a modified embodiment, the projection lens includes a stop, a first lens, a second lens, a third lens, a fourth lens and a fifth lens, which are sequentially arranged along an optical axis from a projection side to an image source side. In projection, light coming from the image source is projected towards the projection side. The first lens is made of plastic and has a convex surface facing the projection side. The fifth lens is made of glass. By the design of the above lenses, the stop and at least one of the above-mentioned conditions (1)-(11) satisfied, the projection lens is able to have the volume effectively reduced, F-number effectively reduced, the field of view effectively promoted, the optical aberration effectively corrected, and the chromatic aberration effectively corrected.

Table 4 shows the optical specification of the projection lens of the modified embodiment.

TABLE 4

Effective Focal Length = 5.2 mm F-number = 1.734
Total Lens Length = 12.829 mm Field of View = 61.400 degrees

| Surface Number | Radius of Curvature (mm) | Thickness (mm) | Refractive Index Nd | Abbe number Vd | Effective Focal Length (mm) | Remark |
|---|---|---|---|---|---|---|
| S41 | ∞ | 0.4 | | | | Stop |
| S42 | 21.4292 | 0.613 | 1.661 | 20.412 | 10.159 | First Lens |
| S43 | −9.9232 | 1.708 | | | | |
| S44 | −2.9698 | 0.300 | 1.714 | 25.000 | −3.427 | Second Lens |
| S45 | 12.6770 | 2.766 | 1.883 | 40.765 | 4.649 | Third Lens |
| S46 | −4.1645 | 0.100 | | | | |
| S47 | 4.8827 | 4.820 | 1.535 | 56.115 | 5.496 | Fourth Lens |
| S48 | −4.9247 | 0.617 | | | | |
| S49 | −4.1024 | 0.300 | 1.535 | 56.115 | −4.833 | Fifth Lens |
| S410 | 7.3143 | 1.205 | | | | |

The definition of aspheric surface sag z of each lens in table 4 is the same as that in table 1, and therefore the descriptions thereof are omitted. The conic constant k and the aspheric coefficients A, B, C, D, E and F of each surface are shown in Table 5.

TABLE 5

| | k | A<br>E | B<br>F | C | D |
|---|---|---|---|---|---|
| S42 | 0.00 | 0.000<br>0.000233471 | −0.007679523<br>−6.15785E−05 | −0.000750565 | −0.00075766 |
| S43 | 0.00 | 0.000<br>9.36368E−05 | −0.008182363<br>−3.02009E−05 | −0.001224555 | −0.000328041 |
| S46 | 0.00 | 0.000<br>0 | 0.000613733<br>0 | 7.92385E−06 | 5.78579E−06 |
| S47 | 0.00 | 0.000<br>0 | −0.001024131<br>0 | 2.09729E−05 | −9.97465E−07 |
| S48 | 0.00 | 0.000<br>0 | 0.002831994<br>0 | −3.8779E−05 | 5.39114E−06 |
| S49 | 0.00 | 0.000<br>1.31161E−06 | 0.001075986<br>9.39233E−09 | 0.000446506 | −2.98748E−05 |
| S410 | 4.2335 | 0.000<br>−1.30166E−05 | −0.003262972<br>4.03241E−07 | −0.000927107 | 0.000161951 |

Table 6 shows the parameters and condition values for conditions (1)-(11) in accordance with the modified embodiment. It can be seen from Table 6 that the projection lens of the modified embodiment satisfies the conditions (1)-(11).

TABLE 6

| BFL | 1.205 mm | IH | 2.780 mm | $f_{23}$ | 40.355 mm |
|---|---|---|---|---|---|
| $f_1/f$ | 1.954 | $f_2/f$ | −0.659 | $f_3/f$ | 0.894 |
| $f_4/f$ | 1.057 | $f_5/f$ | −0.929 | f/TTL | 0.405 |
| BFL/TTL | 0.094 | $f_{23}/f_5$ | −8.350 | IH/f | 0.535 |
| $f_4/f_5$ | −1.137 | $f_{23}/f$ | 7.761 | | |

Also, the optical performance of the projection lens of the modified embodiment can meet the requirements. That is, the field curvature and the distortion of the projection lens can be corrected effectively, and the resolution of the projection lens can meet the requirements. Therefore, the projection lens of the modified embodiment is capable of good optical performance.

Table 7 shows the optical specification of the projection lens of another modified embodiment.

TABLE 7

Effective Focal Length = 5.3 mm F-number = 1.432
Total Lens Length = 14.152 mm Field of View = 59.260 degrees

| Surface Number | Radius of Curvature (mm) | Thickness (mm) | Refractive Index Nd | Abbe number Vd | Effective Focal Length (mm) | Remark |
|---|---|---|---|---|---|---|
| S21 | ∞ | 0.4 | | | | Stop |
| S22 | −285.3517 | 1.163 | 1.799 | 44.125 | 15.989 | First Lens |
| S23 | −12.2128 | 1.737 | | | | |
| S24 | −3.2799 | 0.400 | 1.667 | 27.781 | −5.732 | Second Lens |
| S25 | 7.1063 | 3.457 | 1.883 | 40.765 | 5.815 | Third Lens |
| S26 | −5.9410 | 0.100 | | | | |
| S27 | 5.8686 | 3.401 | 1.883 | 40.765 | 4.569 | Fourth Lens |
| S28 | −9.6686 | 0.100 | | | | |
| S29 | −23.7112 | 0.300 | 1.661 | 20.412 | −5.464 | Fifth Lens |
| S210 | 4.3744 | 3.094 | | | | |

The definition of aspheric surface sag z of each lens in table 7 is the same as that in table 1, and therefore the descriptions thereof are omitted. The conic constant k and the aspheric coefficients A, B, C, D, E and F of each surface are shown in Table 8.

TABLE 8

| | k | A E | B F | C | D |
|---|---|---|---|---|---|
| S22 | 0.00 | 0.000 −1.80322E−05 | −0.003607331 6.17019E−07 | −0.000349028 | 5.71539E−05 |
| S23 | 0.00 | 0.000 2.5321E−06 | −0.004566779 −6.57088E−07 | −0.000175655 | −2.16784E−05 |
| S26 | 0.00 | 0.000 0 | 0.000895517 0 | −1.72671E−05 | 1.61556E−06 |
| S27 | 0.00 | 0.000 0 | −0.000120795 0 | −1.98143E−05 | −1.52334E−06 |
| S28 | 0.00 | 0.000 0 | 0.001683345 0 | −4.93966E−05 | 2.91484E−07 |
| S29 | 0.00 | 0.000 6.76513E−07 | −0.001240842 −6.78939E−09 | 0.000397266 | −2.44664E−05 |
| S210 | −0.197 | 0.000 4.20356E−06 | −0.001738521 −2.90402E−07 | 0.000573864 | −2.52463E−05 |

Table 9 shows the parameters and condition values for conditions (1)-(11) in accordance with this modified embodiment. It can be seen from Table 9 that the projection lens of this modified embodiment satisfies the conditions (1)-(11).

TABLE 9

| BFL | 3.094 mm | IH | 2.780 mm | $f_{23}$ | 32.502 mm |
|---|---|---|---|---|---|
| $f_1/f$ | 3.017 | $f_2/f$ | −1.082 | $f_3/f$ | 1.097 |
| $f_4/f$ | 0.862 | $f_5/f$ | −1.031 | f/TTL | 0.374 |
| BFL/TTL | 0.219 | $f_{23}/f_5$ | −5.948 | IH/f | 0.525 |
| $f_4/f_5$ | −0.836 | $f_{23}/f$ | 6.132 | | |

Also, the optical performance of the projection lens of this modified embodiment can meet the requirements. That is, the field curvature and the distortion of the projection lens can be corrected effectively, and the resolution of the projection lens can meet the requirements. Therefore, the projection lens of the modified embodiment is capable of good optical performance.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A beam splitting and combining device, comprising:
a first prism comprising a first surface, a second surface and a third surface;
a second prism comprising a fourth surface, a fifth surface and a sixth surface; and
a first optical film formed between the second surface and the fifth surface;
wherein the fifth surface and the second surface are attached to each other;
wherein the third surface and the sixth surface are disposed in parallel or are coplanar;
wherein the first surface allows a beam in a first range of wavelengths to pass through;
wherein the fourth surface allows a beam in a second range of wavelengths to pass through;
wherein the first optical film allows the beam in the first range of wavelengths to pass through, and reflects the beam in the second range of wavelengths;
wherein the sixth surface allows the beams in the first or/and second ranges of wavelengths to pass through and reflects a beam in a third range of wavelengths;

wherein the beam in the first range of wavelengths is configured to pass through the first surface, the second surface, the first optical film, the fifth surface and the sixth surface in order or in reverse order, or is configured to pass through the first surface and the third surface in order or in reverse order.

2. The beam splitting and combining device as claimed in claim 1, wherein:
the third surface allows the beam in the first range of wavelengths to pass through and reflects the beam in the third range of wavelengths;
a part of the beam in the first range of wavelengths passes through the first surface and the third surface in order or in reverse order;
a part of the beam in the third range of wavelengths is reflected on the third surface.

3. The beam splitting and combining device as claimed in claim 1, further comprising:
a third prism comprising a seventh surface, an eighth surface, a ninth surface, a tenth surface and an eleventh surface; and
a second optical film formed between the sixth surface and the eighth surface;
wherein the eighth surface and the sixth surface are attached to each other;
wherein the seventh surface allows the beam in the third range of wavelengths to pass through;
wherein the ninth surface allows the beams in the first, second and third ranges of wavelengths to pass through;
wherein the tenth surface allows the beam in the second range of wavelengths to pass through;
wherein the eleventh surface allows the beam in the first range of wavelengths to pass through and reflects the beam in the second range of wavelengths;
wherein the second optical film allows the beam in the first range of wavelengths to pass through and reflects the beam in the third range of wavelengths;
wherein the third surface and the sixth surface are disposed in parallel or are coplanar;
wherein the third surface allows the beam in the first range of wavelengths to pass through and reflects the beam in the third range of wavelengths.

4. The beam splitting and combining device as claimed in claim 3, wherein:
the beam in the first range of wavelengths passes through the first surface, the third surface, the eleventh surface, and the ninth surface in order or in reverse order, and/or passes through the first surface, the second surface, the first optical film, the fifth surface, the sixth surface, the second optical film, the eighth surface and the ninth surface in order or in reverse order;
the beam in the second range of wavelengths passes through the tenth surface, is reflected on the eleventh surface, and passes through the ninth surface in order or in reverse order, and/or passes through the fourth surface, reaches the fifth surface, is reflected on the first optical film, passes through the sixth surface, passes through the second optical film, passes through the eighth surface and passes through the ninth surface in order or in reverse order;
the beam in the third range of wavelengths is reflected on the third surface, passes through the eleventh surface, and passes through the ninth surface in order or in reverse order, or passes through the seventh surface, reaches the eighth surface, is reflected on the second optical film and passes through the ninth surface in order or in reverse order.

5. The beam splitting and combining device as claimed in claim 1, further comprising:
a third prism comprising a seventh surface, an eighth surface and a ninth surface; and
a second optical film formed between the third surface and the eighth surface;
wherein the seventh surface allows the beam in the third range of wavelengths to pass through;
wherein the eighth surface and the third surface are attached to each other;
wherein the ninth surface allows the beam in the first range of wavelengths to pass through, and reflects the beam in the second range of wavelengths;
wherein the second optical film allows the beam in the first range of wavelengths to pass through, and reflects the beam in the third range of wavelengths;
wherein the third surface and the sixth surface are disposed in parallel or are coplanar;
wherein the third surface allows the beam in the first range of wavelengths to pass through and reflects the beam in the third range of wavelengths;
wherein the beam in the first range of wavelengths passes through the first surface, the second surface, the first optical film, the fifth surface, and the sixth surface in order or in reverse order, or passes through the first surface, the third surface, the second optical film, the eighth surface and the ninth surface in order or in reverse order;
wherein the beam in the second range of wavelengths passes through the fourth surface, is reflected on the first optical film, and passes through the sixth surface in order or in reverse order, or is reflected on the ninth surface;
wherein the beam in the third range of wavelengths passes through the seventh surface, is reflected on the second optical film, passes through the ninth surface in order or in reverse order, or is reflected on the sixth surface.

6. The beam splitting and combining device as claimed in claim 1, wherein:
the first prism is a square pyramidal prism and further comprises a seventh surface allowing the beam in the second range of wavelengths to pass through, and an eighth surface allowing the beam in the third range of wavelengths to pass through;
the second prism is a triangular pyramidal prism and further comprises a ninth surface allowing the beam in the third range of wavelengths to pass through;
a part of the beam in the first range of wavelengths passes through the first surface, the second surface, the first optical film, the fifth surface, and the sixth surface in order or in reverse order;
another part of the beam in the first range of wavelengths passes through the first surface and the third surface in order or in reverse order;
the beam in the second range of wavelengths passes through the first surface, is reflected on the first optical film, and passes through the seventh surface in order or in reverse order;
a part of the beam in the third range of wavelengths passes through the first surface, is reflected on the third surface, and passes through the eighth surface in order or in reverse order.

7. The beam splitting and combining device as claimed in claim 4, further comprising:

a fourth prism comprising a twelfth surface, a thirteenth surface, a fourteenth surface, and a fifteenth surface;
a third optical film formed between the thirteenth surface and the eleventh surface; and
a fourth optical film formed between the fifteenth surface and the third surface;
wherein the thirteenth surface and the eleventh surface are attached to each other;
wherein the fifteenth surface and the third surface are attached to each other;
wherein the twelfth surface allows the beam in the third range of wavelengths to pass through;
wherein the third optical film allows the beam in the first range of wavelengths to pass through and reflects the beam in the second range of wavelengths;
wherein the fourteenth surface allows the beam in the first range of wavelengths to pass through and reflects the beam in the second range of wavelengths;
wherein the fourth optical film allows the beam in the first range of wavelengths to pass through and reflects the beam in the third range of wavelengths;
wherein the beam in the first range of wavelengths passes through the first surface, the second surface, the first optical film, the fifth surface, the sixth surface, the second optical film, the eighth surface and the ninth surface in order or in reverse order, and/or passes through the first surface, the third surface, the fourth optical film, the fifteenth surface, the thirteenth surface, the third optical film, the eleventh surface and the ninth surface in order or in reverse order;
wherein the beam in the second range of wavelengths passes through the fourth surface, reaches the fifth surface, is reflected on the first optical film, passes through the sixth surface, passes through the second optical film, passes through the eighth surface and passes through the ninth surface in order or in reverse order, or passes through the tenth surface, is reflected on the third optical film, and passes through the ninth surface in order or in reverse order;
wherein the beam in the third range of wavelengths passes through the seventh surface, reaches the eighth surface, is reflected on the second optical film, and passes through the ninth surface in order or in reverse order, or passes through the twelfth surface, is reflected on the fourth optical film, passes through the eleventh surface and passes through the ninth surface in order or in reverse order.

8. The beam splitting and combining device as claimed in claim 1, wherein:
any two of the first, second and third ranges do not overlap; and the beam splitting and combining device satisfies at least one of following conditions:
any wavelength of the beam in the first range and that in the second range have a difference greater than 20 nm, any wavelength of the beam in the second range and that in the third range have a difference greater than 20 nm, and any wavelength of the beam in the third range and that in the first range have a difference greater than 20 nm; and
the third range is not between the first range and the second range.

9. A projecting related device comprising a light source, the beam splitting and combining device as claimed in claim 1, a relay lens assembly, and a projection lens.

10. The projecting related device as claimed in claim 9, wherein:

the projection lens includes a first lens, a second lens, a third lens, a fourth lens and a fifth lens sequentially arranged from a projection side to an image source side along an optical axis;
the first lens is with positive refractive power, has a concave surface or a convex surface facing the projection side, and has a convex surface facing the image source side;
the second lens is with negative refractive power, and has a concave surface facing the projection side and another concave surface facing the image source side;
the third lens is with positive refractive power, and has a convex surface facing the projection side and another convex surface facing the image source side;
the fourth lens is with positive refractive power, and has a convex surface facing the projection side and another convex surface facing the image source side;
the fifth lens is with negative refractive power, and has a concave surface facing the projection side and another concave surface facing the image source side.

11. The projecting related device as claimed in claim 10, wherein the projection lens further includes a stop disposed between the projection side and the first lens, and the projection lens satisfies any one of the following conditions:

$-1.2 \leq f_5/f \leq -0.9$;

$1.9 \leq f_1/f \leq 3.7$;

$-1.1 \leq f_2/f \leq -0.6$;

$0.8 \leq f_3/f \leq 1.2$;

$0.8 \leq f_4/f \leq 1.1$;

$0.3 \leq f/TTL \leq 0.45$;

$0.09 \leq BFL/TTL \leq 0.22$;

$0.5 \leq IH/f \leq 0.65$;

$-17 \leq f_{23}/f_5 \leq 30$;

$-1.15 \leq f_4/f_5 \leq -0.75$;

$-33 \leq f_{23}/f \leq 16$, where f is an effective focal length of the projection lens, $f_1$ is an effective focal length of the first lens, $f_2$ is an effective focal length of the second lens, $f_3$ is an effective focal length of the third lens, $f_4$ is an effective focal length of the fourth lens, $f_5$ is an effective focal length of the fifth lens, $f_{23}$ is an effective focal length of combination of the second lens and the third lens, TTL is an interval from the stop to the image source side along the optical axis, BFL is an interval from the concave surface facing the image source side to the image source side along the optical axis, and IH is a half image height of the projection lens.

12. A projecting related device comprising:
a beam splitting and combining device comprising a first prism and a second prism;
a projection lens comprising a first lens, a second lens, a third lens, a fourth lens and a fifth lens sequentially arranged from a projection side to an image source side along an optical axis;
wherein the first prism comprises a first surface, a second surface and a third surface;
wherein the second prism comprises a sixth surface;

wherein the third surface and the sixth surface are disposed in parallel or are coplanar;
wherein the first surface allows a beam in a first range of wavelengths to pass through, and reflects a beam in a second range of wavelengths;
wherein the beam in the second range of wavelengths is incident on the second surface;
wherein the third surface allows the beam in the first range of wavelengths to pass through and reflects the beam in a third range of wavelengths;
wherein the beam in the first range of wavelengths is configured to pass through the first surface and the third surface in order or in reverse order;
wherein the beam in the second range of wavelengths is configured to pass through the second surface, to reach the first surface and to be reflected on the first surface;
wherein the first lens is with positive refractive power, has a concave surface or a convex surface facing the projection side, and has a convex surface facing the image source side;
wherein the second lens is with negative refractive power, and has a concave surface facing the projection side and another concave surface facing the image source side;
wherein the third lens is with positive refractive power, and has a convex surface facing the projection side and another convex surface facing the image source side;
wherein the fourth lens is with positive refractive power, and has a convex surface facing the projection side and another convex surface facing the image source side;
wherein the fifth lens is with negative refractive power, and has a concave surface facing the projection side and another concave surface facing the image source side.

13. The projecting related device as claimed in claim 12, further comprising a light source and a relay lens assembly.

14. The projecting related device as claimed in claim 12, wherein the projection lens further includes a stop disposed between the projection side and the first lens, and the projection lens satisfies any one of the following conditions:

$-1.2 \leq f_5/f \leq -0.9$;

$1.9 \leq f_1/f \leq 3.7$;

$-1.1 \leq f_2/f \leq -0.6$;

$0.8 \leq f_3/f \leq 1.2$;

$0.8 \leq f_4/f \leq 1.1$;

$0.3 \leq f/TTL \leq 0.45$;

$0.09 \leq BFL/TTL \leq 0.22$;

$0.5 \leq IH/f \leq 0.65$;

$-17 \leq f_{23}/f_5 \leq 30$;

$-1.15 \leq f_4/f_5 \leq -0.75$;

$-33 \leq f_{23}/f \leq 16$, where f is an effective focal length of the projection lens, $f_1$ is an effective focal length of the first lens, $f_2$ is an effective focal length of the second lens, $f_3$ is an effective focal length of the third lens, $f_4$ is an effective focal length of the fourth lens, $f_5$ is an effective focal length of the fifth lens, $f_{23}$ is an effective focal length of combination of the second lens and the third lens, TTL is an interval from the stop to the image source side along the optical axis, BFL is an interval from the concave surface facing the image source side to the image source side along the optical axis, and IH is a half image height of the projection lens.

15. A beam splitting and combining device, comprising:
a first prism comprising a first surface, a second surface and a third surface;
a second prism comprising a fourth surface, a fifth surface and a sixth surface; and
a first optical film formed between the second surface and the fifth surface;
wherein the first prism is a square pyramidal prism;
wherein the fifth surface and the second surface are attached to each other;
wherein the first surface allows a beam in a first range of wavelengths to pass through;
wherein the fourth surface allows a beam in a second range of wavelengths to pass through;
wherein the first optical film allows the beam in the first range of wavelengths to pass through, and reflects the beam in the second range of wavelengths;
wherein the sixth surface allows the beams in the first or/and second ranges of wavelengths to pass through and reflects a beam in a third range of wavelengths;
wherein the beam in the first range of wavelengths is configured to pass through the first surface, the second surface, the first optical film, the fifth surface and the sixth surface in order or in reverse order, or is configured to pass through the first surface and the third surface in order or in reverse order.

* * * * *